US012657572B2

(12) United States Patent
Rapowitz et al.

(10) Patent No.: US 12,657,572 B2
(45) Date of Patent: Jun. 16, 2026

(54) SYSTEMS AND METHODS FOR ENABLING TRANSACTION DISTRIBUTION

(71) Applicant: Capital One Services, LLC, McLean, VA (US)

(72) Inventors: Samuel Rapowitz, Roswell, GA (US); Bryant Yee, Silver Spring, MD (US); Armando Martinez Stone, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/096,953

(22) Filed: Jan. 13, 2023

(65) Prior Publication Data

US 2024/0242199 A1 Jul. 18, 2024

(51) Int. Cl.
*G06Q 20/20* (2012.01)
*G06Q 20/34* (2012.01)

(52) U.S. Cl.
CPC ......... *G06Q 20/352* (2013.01); *G06Q 20/341* (2013.01); *G06Q 20/20* (2013.01)

(58) Field of Classification Search
None
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,590,038 A | 12/1996 | Pitroda | |
| 5,592,553 A | 1/1997 | Guski et al. | |
| 5,616,901 A | 4/1997 | Crandall | |
| 5,666,415 A | 9/1997 | Kaufman | |

(Continued)

FOREIGN PATENT DOCUMENTS

| | | |
|---|---|---|
| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — William J Jacob

(74) *Attorney, Agent, or Firm* — KDW Firm PLLC; Andrew Kasenvich

(57) ABSTRACT

Systems and methods for distributing a transaction among multiple parties are provided. In exemplaray embodiments where users have two or more contactless cards, each card can be tapped to a user device, and a user device application can receive payment information from each card. The user device application can transmit payment information from each card to one selected card. The selected card can then transmit payment information from each card, including its own payment information, to a payment processor.

20 Claims, 20 Drawing Sheets

Contactless Card 1300

First Payment Section 1305

First Non-Payment Section 1310

Second Non-Payment Section 1315

First Contact Pad 1306

(56) References Cited

U.S. PATENT DOCUMENTS

| | | | |
|---|---|---|---|
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,346,670 B2 | 1/2013 | Hasson |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,511,547 B2 | 8/2013 | Rans |
| 8,519,822 B2 | 8/2013 | Riegebauer |
| 8,559,872 B2 | 10/2013 | Butler |

(56) References Cited

U.S. PATENT DOCUMENTS

| | | | |
|---|---|---|---|
| 8,566,916 | B1 | 10/2013 | Vernon et al. |
| 8,567,670 | B2 | 10/2013 | Stanfield et al. |
| 8,572,386 | B2 | 10/2013 | Takekawa et al. |
| 8,577,810 | B1 | 11/2013 | Dalit et al. |
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | De Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | Von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |
| 11,037,136 | B2 | 6/2021 | Rule |
| 11,062,098 | B1 | 7/2021 | Bergeron |
| 11,120,453 | B2 | 9/2021 | Rule |
| 11,138,593 | B1 | 10/2021 | Ho |
| 11,138,605 | B2 | 10/2021 | Aabye |
| 11,176,540 | B2 | 11/2021 | Gupta |
| 11,188,908 | B2 | 11/2021 | Locke |
| 11,216,806 | B2 | 1/2022 | Mossler |
| 11,297,958 | B2 | 4/2022 | Vukich |
| 11,334,872 | B2 | 5/2022 | Phillips |
| 11,361,173 | B2 | 6/2022 | Edwards |
| 11,392,933 | B2 | 7/2022 | Mossler |
| 11,392,935 | B2 | 7/2022 | Suresh |
| 11,416,844 | B1 | 8/2022 | Osterkamp |
| 11,423,392 | B1 | 8/2022 | Ho |
| 11,443,292 | B2 | 9/2022 | Sherif |
| 11,444,770 | B2 | 9/2022 | Wieker |
| 11,461,764 | B2 | 10/2022 | Rule |
| 11,481,764 | B2 | 10/2022 | Shakkarwar |
| 11,521,213 | B2 | 12/2022 | Rule |

(56)                 References Cited

U.S. PATENT DOCUMENTS

| | | | |
|---|---|---|---|
| 11,551,200 | B1 | 1/2023 | Cook |
| 11,556,918 | B2 | 1/2023 | Mestre |
| 11,615,395 | B2 | 3/2023 | McHugh |
| 11,777,933 | B2 | 10/2023 | Moreton |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2003/0220876 | A1 | 11/2003 | Burger |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0210498 | A1* | 10/2004 | Freund .................. G06F 21/35 |
| | | | 705/30 |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0228997 | A1 | 10/2005 | Bicker |
| 2005/0247797 | A1 | 11/2005 | Ramachandran |
| 2005/0269402 | A1 | 12/2005 | Spitzer |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0276765 | A1 | 11/2007 | Hazel |
| 2007/0278291 | A1 | 12/2007 | Rans et al. |
| 2008/0008315 | A1 | 1/2008 | Fontana et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0082452 | A1 | 4/2008 | Wankmueller |
| 2008/0086767 | A1 | 4/2008 | Kulkarni et al. |
| 2008/0099552 | A1 | 5/2008 | Grillion |
| 2008/0103968 | A1 | 5/2008 | Bies et al. |
| 2008/0109309 | A1 | 5/2008 | Landau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |
| 2008/0162312 | A1 | 7/2008 | Sklovsky et al. |
| 2008/0164308 | A1 | 7/2008 | Aaron et al. |
| 2008/0207307 | A1 | 8/2008 | Cunningham II et al. |
| 2008/0209543 | A1 | 8/2008 | Aaron |
| 2008/0223918 | A1 | 9/2008 | Williams et al. |
| 2008/0285746 | A1 | 11/2008 | Landrock et al. |
| 2008/0308641 | A1 | 12/2008 | Finn |
| 2009/0037275 | A1 | 2/2009 | Pollio |
| 2009/0048026 | A1 | 2/2009 | French |
| 2009/0132417 | A1 | 5/2009 | Scipioni et al. |
| 2009/0143104 | A1 | 6/2009 | Loh et al. |
| 2009/0171682 | A1 | 7/2009 | Dixon et al. |
| 2009/0210308 | A1 | 8/2009 | Toomer et al. |
| 2009/0235339 | A1 | 9/2009 | Mennes et al. |
| 2009/0249077 | A1 | 10/2009 | Gargaro et al. |
| 2009/0282264 | A1 | 11/2009 | Amiel et al. |
| 2010/0023449 | A1 | 1/2010 | Skowronek et al. |
| 2010/0023455 | A1 | 1/2010 | Dispensa et al. |
| 2010/0029202 | A1 | 2/2010 | Jolivet et al. |
| 2010/0033310 | A1 | 2/2010 | Narendra et al. |
| 2010/0036769 | A1 | 2/2010 | Winters et al. |
| 2010/0078471 | A1 | 4/2010 | Lin et al. |
| 2010/0082491 | A1 | 4/2010 | Rosenblatt et al. |
| 2010/0094754 | A1 | 4/2010 | Bertran et al. |
| 2010/0095130 | A1 | 4/2010 | Bertran et al. |
| 2010/0100480 | A1 | 4/2010 | Altman et al. |
| 2010/0114731 | A1 | 5/2010 | Kingston et al. |
| 2010/0192230 | A1 | 7/2010 | Steeves et al. |
| 2010/0207742 | A1 | 8/2010 | Buhot et al. |
| 2010/0211797 | A1 | 8/2010 | Westerveld et al. |
| 2010/0240413 | A1 | 9/2010 | He et al. |
| 2010/0257357 | A1 | 10/2010 | McClain |
| 2010/0312634 | A1 | 12/2010 | Cervenka |
| 2010/0312635 | A1 | 12/2010 | Cervenka |
| 2011/0028160 | A1 | 2/2011 | Roeding et al. |
| 2011/0035604 | A1 | 2/2011 | Habraken |
| 2011/0060631 | A1 | 3/2011 | Grossman et al. |
| 2011/0068170 | A1 | 3/2011 | Lehman |
| 2011/0084132 | A1 | 4/2011 | Tofighbakhsh |
| 2011/0101093 | A1 | 5/2011 | Ehrensvard |
| 2011/0113245 | A1 | 5/2011 | Varadrajan |
| 2011/0125638 | A1 | 5/2011 | Davis et al. |
| 2011/0131415 | A1 | 6/2011 | Schneider |
| 2011/0153437 | A1 | 6/2011 | Archer et al. |
| 2011/0153496 | A1 | 6/2011 | Royyuru |
| 2011/0155801 | A1 | 6/2011 | Rowberry |
| 2011/0208658 | A1 | 8/2011 | Makhotin |
| 2011/0208965 | A1 | 8/2011 | Machani |
| 2011/0211219 | A1 | 9/2011 | Bradley |
| 2011/0218911 | A1 | 9/2011 | Spodak |
| 2011/0238564 | A1 | 9/2011 | Lim et al. |
| 2011/0246780 | A1 | 10/2011 | Yeap et al. |
| 2011/0258452 | A1 | 10/2011 | Coulier et al. |
| 2011/0280406 | A1 | 11/2011 | Ma et al. |
| 2011/0282785 | A1 | 11/2011 | Chin |
| 2011/0294418 | A1 | 12/2011 | Chen |
| 2011/0312271 | A1 | 12/2011 | Ma et al. |
| 2012/0024947 | A1 | 2/2012 | Naelon |
| 2012/0030047 | A1 | 2/2012 | Fuentes et al. |
| 2012/0030121 | A1 | 2/2012 | Grellier |
| 2012/0047071 | A1 | 2/2012 | Mullen et al. |
| 2012/0079281 | A1 | 3/2012 | Lowenstein et al. |
| 2012/0109735 | A1 | 5/2012 | Krawczewicz et al. |
| 2012/0109764 | A1 | 5/2012 | Martin et al. |
| 2012/0143703 | A1 | 6/2012 | Wall |
| 2012/0143754 | A1 | 6/2012 | Patel |
| 2012/0150737 | A1 | 6/2012 | Rottink |
| 2012/0178366 | A1 | 7/2012 | Levy et al. |
| 2012/0196583 | A1 | 8/2012 | Kindo |
| 2012/0207305 | A1 | 8/2012 | Gallo et al. |
| 2012/0209773 | A1 | 8/2012 | Ranganathan |
| 2012/0238206 | A1 | 9/2012 | Singh et al. |
| 2012/0239560 | A1 | 9/2012 | Pourfallah et al. |
| 2012/0252350 | A1 | 10/2012 | Steinmetz et al. |
| 2012/0254394 | A1 | 10/2012 | Barras |
| 2012/0284194 | A1 | 11/2012 | Liu et al. |
| 2012/0290472 | A1 | 11/2012 | Mullen et al. |

(56) References Cited

U.S. PATENT DOCUMENTS

| | | |
|---|---|---|
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0149742 A1 | 5/2014 | Yau |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0033291 A1 | 1/2015 | Nicolau |
| 2015/0071486 A1 | 3/2015 | Rhoads et al. |
| 2015/0073983 A1 | 3/2015 | Bartenstein |
| 2015/0088757 A1 | 3/2015 | Zhou et al. |
| 2015/0089586 A1 | 3/2015 | Ballesteros |
| 2015/0113271 A1 | 4/2015 | Jooste |
| 2015/0134452 A1 | 5/2015 | Williams |
| 2015/0134513 A1 | 5/2015 | Olson |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins |
| 2015/0205379 A1 | 7/2015 | Mag et al. |
| 2015/0254637 A1 | 9/2015 | Yang |
| 2015/0254639 A1 | 9/2015 | Radu |
| 2015/0302409 A1 | 10/2015 | Malek |
| 2015/0317295 A1 | 11/2015 | Sherry |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0200146 A1* | 7/2017 | Park .................. G06Q 20/3278 |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0357962 A1* | 12/2017 | Ghanta ............. G06Q 20/3567 |
| 2017/0374070 A1 | 12/2017 | Shah et al. |
| 2018/0034507 A1 | 2/2018 | Wobak et al. |

(56) References Cited

U.S. PATENT DOCUMENTS

| | | | |
|---|---|---|---|
| 2018/0039986 A1 | 2/2018 | Essebag et al. | |
| 2018/0039987 A1 | 2/2018 | Molino | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0172055 A1 | 6/2019 | Hale | |
| 2019/0238517 A1 | 8/2019 | D'Agostino et al. | |
| 2019/0303945 A1 | 10/2019 | Mitra | |
| 2020/0034818 A1 | 1/2020 | Zhou | |
| 2020/0380495 A1* | 12/2020 | Kang | G06Q 20/4097 |
| 2021/0004800 A1* | 1/2021 | Aggarwal | G06Q 20/405 |
| 2021/0004806 A1 | 1/2021 | Noe | |
| 2021/0067201 A1* | 3/2021 | Wang | H04W 4/80 |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | |
|---|---|---|---|
| CN | 103023643 | | 4/2013 |
| CN | 103417202 | | 12/2013 |
| EP | 1 085 424 | | 3/2001 |
| EP | 1 223 565 | | 7/2002 |
| EP | 1 265 186 | | 12/2002 |
| EP | 1 783 919 | | 5/2007 |
| EP | 2 852 070 | | 1/2009 |
| EP | 2 139 196 | | 12/2009 |
| EP | 1 469 419 | | 2/2012 |
| GB | 2 457 221 | | 8/2009 |
| GB | 2 516 861 | | 2/2015 |
| GB | 2 551 907 | | 1/2018 |
| KR | 101508320 | | 4/2015 |
| KR | 20150140132 | A | 12/2015 |
| WO | 9910824 | A1 | 3/1999 |
| WO | WO 00/49586 | | 8/2000 |
| WO | WO 2006070189 | | 7/2006 |
| WO | WO 2008055170 | | 5/2008 |
| WO | WO 2009025605 | | 2/2009 |
| WO | WO 2010049252 | | 5/2010 |
| WO | WO 2011112158 | | 9/2011 |
| WO | WO 2012001624 | | 1/2012 |
| WO | WO 2013039395 | | 3/2013 |
| WO | WO 2013155562 | | 10/2013 |
| WO | WO 2013192358 | | 12/2013 |
| WO | WO 2014043278 | | 3/2014 |
| WO | WO 2014170741 | | 10/2014 |
| WO | WO 2015179649 | | 11/2015 |
| WO | WO 2015183818 | | 12/2015 |
| WO | WO 2016097718 | | 6/2016 |
| WO | WO 2016160816 | | 10/2016 |
| WO | WO 2016168394 | | 10/2016 |
| WO | 2017047855 | A1 | 3/2017 |
| WO | WO 2017042375 | | 3/2017 |
| WO | WO 2017042400 | | 3/2017 |
| WO | WO 2017157859 | | 9/2017 |
| WO | WO 2017208063 | | 12/2017 |
| WO | WO 2018063809 | | 4/2018 |
| WO | WO 2018137888 | | 8/2018 |
| WO | 2019022585 | A1 | 1/2019 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

(56) References Cited

OTHER PUBLICATIONS

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSlam: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

The International Search Report and Written Opinion mailed Apr. 17, 2024, for related PCT/US24/11346 (seven (7) pages).

Author Unknown, "Global expansion of card tapping mobile OTP for security and convenience is imminent," Jun. 28, 2022, website: https://www.swidch.com/blogs/card-tapping-motp-blog.

Emvco, LLC, "Emv Card Personalisation Specification", Aug. 1, 2021, pp. 1-114, Retrieved from the Internet URL: https://www.emvco.com/specification/?post_id=12467.

Saush, "Getting information from an EMV chip card with Java," Sep. 8, 2006, WordPress, pp. 1-13.

Smart Card Alliance, "Co-Branded Multi-Application Contactless Cards for Transit and Financial Payment," A Smart Card Alliance Transportation Council White Paper (40 pages), Mar. 2008.

* cited by examiner

System 100

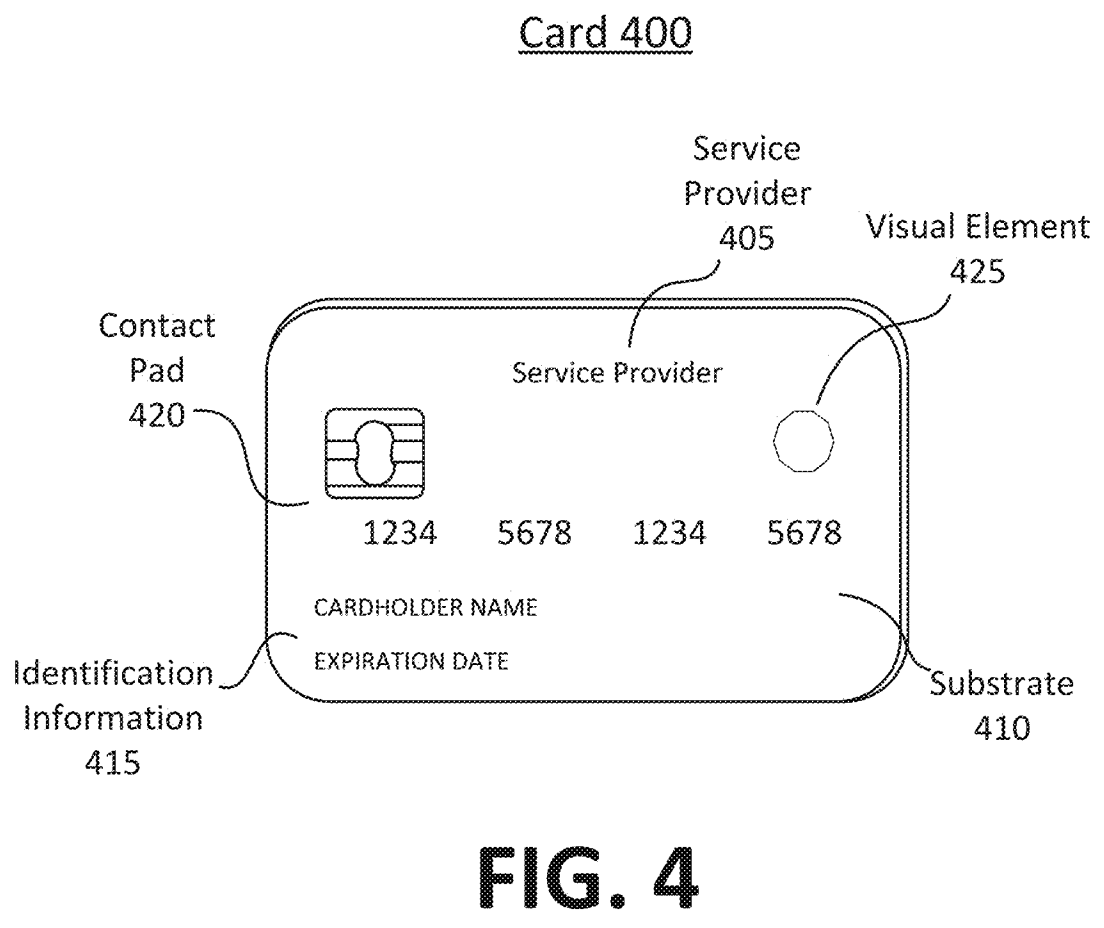

Card 400

Service Provider 405

Visual Element 425

Substrate 410

Contact Pad 420

Identification Information 415

Service Provider 1234 5678 1234 5678

CARDHOLDER NAME

EXPIRATION DATE

FIG. 4

Method 500

Diagram 600

Communication Field
615

Card
610

User Device
605

Process 800

805 Open First Communication Field

810 Receive Payment Information Over First Communication Field From Multiple Cards 815 Select One Contactless Card 820 Open Second Communication Field 825 Transmit Payment Information and Request To Selected Contactless Card Process 900

905 Open Communication Field

910 Receive Payment Information Over Communication Field

915 Select One Contactless Card

920 Transmit Payment Information and Request

925 Receive Authentication Request

930 Open Second Communication Field

935 Receive Authentication Credential

940 Transmit Authentication Credential To Payment Information Processor

Process 1000

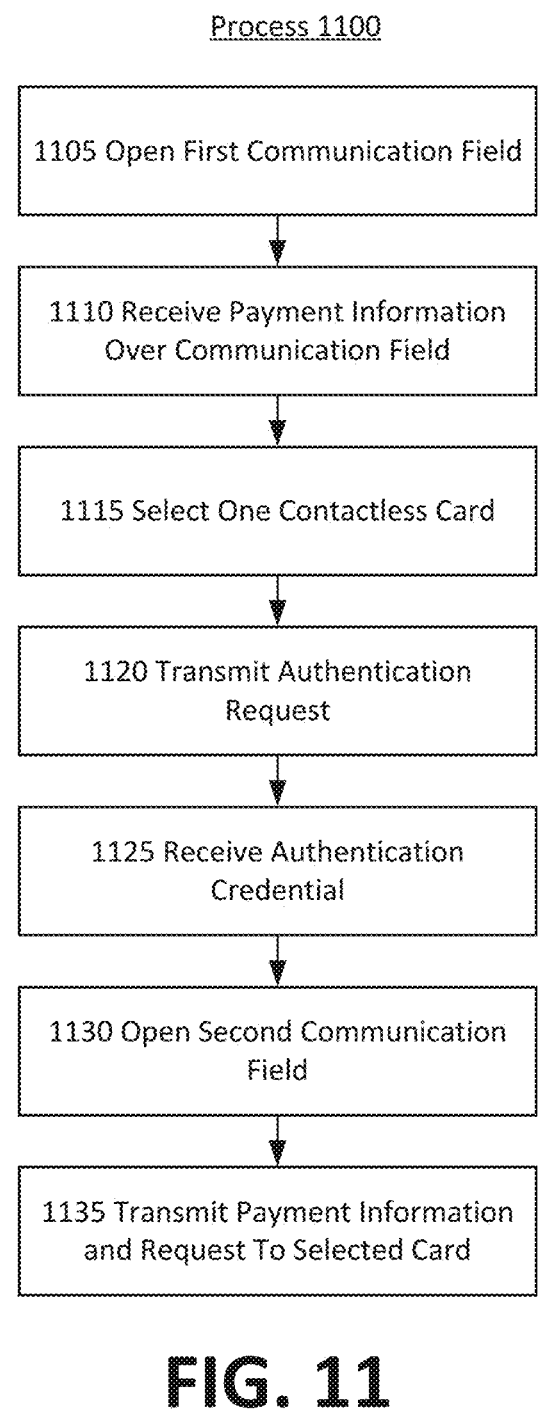

Process 1100

1105 Open First Communication Field

1110 Receive Payment Information Over Communication Field

1115 Select One Contactless Card

1120 Transmit Authentication Request

1125 Receive Authentication Credential

1130 Open Second Communication Field

1135 Transmit Payment Information and Request To Selected Card

FIG. 11

Process 1200

1205 Open First Communication Field

1210 Receive Payment Information Over First Communication Field

1215 Select One Contactless Card

1220 Transmit Distribution Requests

1225 Receive Distribution Responses

1230 Integrate Distribution Responses Into Request

1235 Open Second Communication Field

1240 Transmit Payment Information and Request To Selected Card

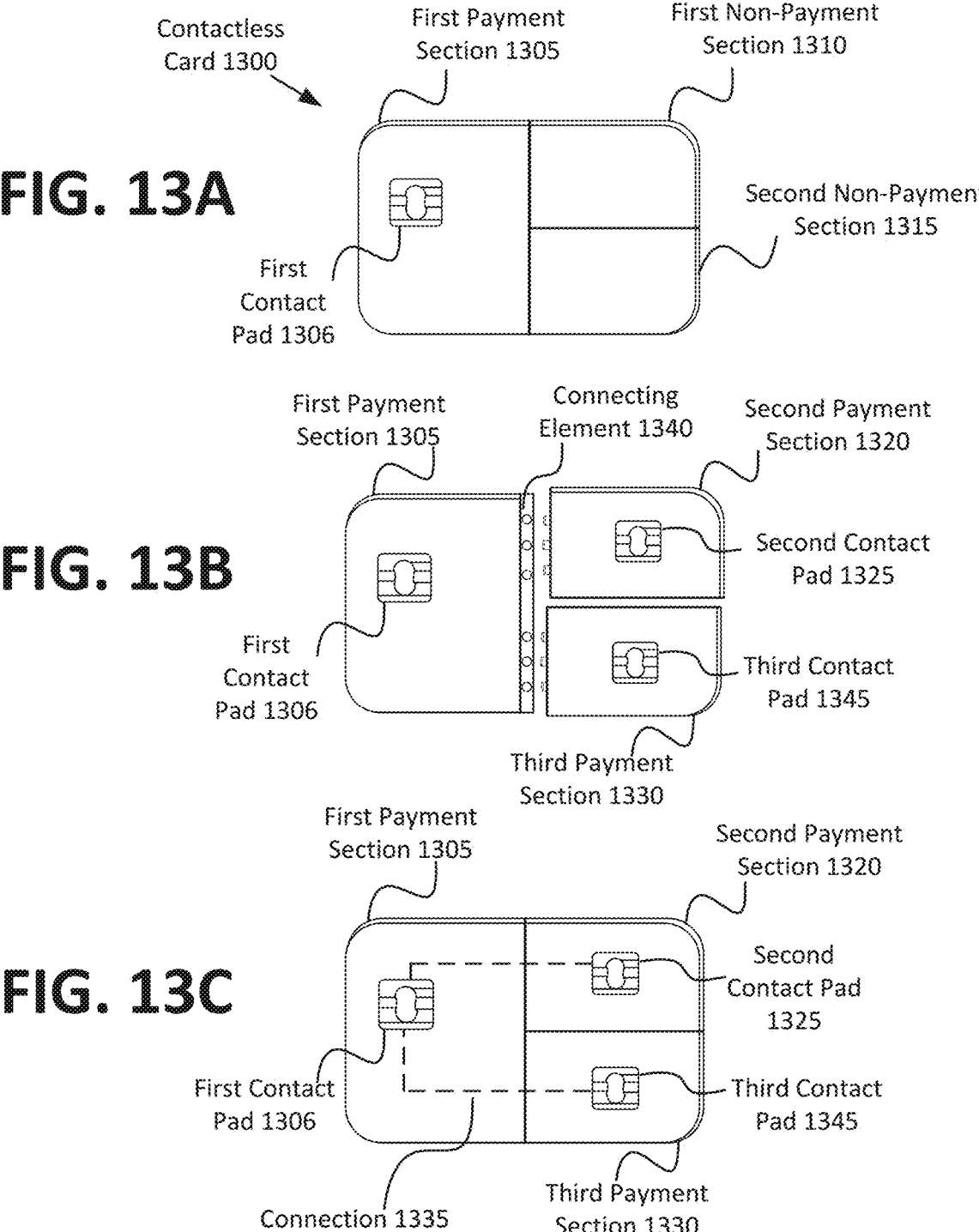

FIG. 13A

Contactless Card 1300

First Payment Section 1305

First Non-Payment Section 1310

Second Non-Payment Section 1315

First Contact Pad 1306

FIG. 13B

First Payment Section 1305

Connecting Element 1340

Second Payment Section 1320

Second Contact Pad 1325

First Contact Pad 1306

Third Contact Pad 1345

Third Payment Section 1330

FIG. 13C

First Payment Section 1305

Second Payment Section 1320

Second Contact Pad 1325

First Contact Pad 1306

Third Contact Pad 1345

Connection 1335

Third Payment Section 1330

1350 Mate Payment Sections Of One Or More Contactless Cards

1355 Receive One Or More Payment Information From Contactless Cards

1360 Receive Request To Distribute Transaction

1365 Store One Or More Payment Information

1370 Transmit Payment Information And Request To Payment Processor

1450 Mate Magnets Of One Or More Contactless Cards

1455 Receive One Or More Payment Information From Contactless Cards

1460 Receive Request To Distribute Transaction

1465 Store One Or More Payment Information

1470 Transmit Payment Information And Request To Payment Processor

Second Contactless Card 1610

Third Contactless Card 1615

First Contactless Card 1605

Fourth Contactless Card 1620

First Communication Field 1625

Second Communication Field 1630

First Contactless Card 1605

Payment Processor 1635

1650 Open First Communication Field

1655 Receive One Or More Payment Information From Other Contactless Cards

1660 Store One Or More Payment Information

1665 Transmit Payment Information And Request To Payment Processor

SYSTEMS AND METHODS FOR ENABLING TRANSACTION DISTRIBUTION

FIELD OF THE DISCLOSURE

The present disclosure relates to systems and methods for distributing a transaction among multiple parties.

BACKGROUND

Distributing the cost of a transaction among multiple parties can be time consuming. For example, a group of friends are paying their bill at a restaurant. Often, one friend pays the entire bill, then requests payment from the remaining friends. The friends must then find the correct payment information, download a payment-sharing application, link their payment cards to the application, then send payment. This is time consuming and frustrating for the users. Also, this process leaves room for human error. For example, a friend might miscalculate how much they owe, or they might send their payment to the incorrect recipient. This example is extendable to other large payments shared by groups such as vacation rentals and other large group purchases.

These and other deficiencies exist. Therefore, there is a need to provide systems and methods that overcome these deficiencies and enable transaction distribution in a secure and efficient manner.

SUMMARY OF THE DISCLOSURE

In some aspects, the techniques described herein relate to a system for distributing a transaction, the system including: a user device application configured to: open a communication field; receive, from each of a plurality of contactless cards, payment information via the communication field; select one of the plurality of contactless cards; and transmit, to the selected contactless card, the payment information of one or more non-selected contactless cards and a request, wherein the request includes a request to distribute a transaction among each of the selected and non-selected contactless cards, and wherein the selected contactless card is configured to transmit the payment information and the request to a payment information processor.

In some aspects, the techniques described herein relate to a method for distributing a transaction, the method including: opening, by a processor, a communication field; receiving, by the processor from each of a plurality of contactless cards, payment information via the communication field; selecting, by the processor, one of the plurality of contactless cards; and transmitting, to the selected contactless card, the payment information of one or more non-selected contactless cards and a request, wherein the request includes a request to distribute a transaction among each of the selected and non-selected contactless cards, and wherein the selected contactless card is configured to transmit the payment information and the request to a payment information processor.

In some aspects, the techniques described herein relate to a non-transitory computer readable medium containing computer executable instructions that, when executed by a wearable device including a processor, configure the computer hardware arrangement to perform procedures including: opening a communication field; receiving, from each of a plurality of contactless cards, payment information via the communication field; selecting one of the plurality of contactless cards; transmitting, to the selected contactless card, the payment information of the one or more non-selected contactless cards and a request, wherein the request includes a request to distribute a transaction among each of the selected and non-selected contactless cards, and wherein the selected contactless card is configured to transmit the payment information and the request to a payment information processor.

Further features of the disclosed systems and methods, and the advantages offered thereby, are explained in greater detail hereinafter with reference to specific exemplary embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 illustrates a card with a visual element according to an exemplary embodiment.

FIG. 11 is a method diagram illustrating a process for requesting authentication credentials from one or more cardholders according to an exemplary embodiment.

FIGS. 13A-13D illustrate one or more contactless cards with interchangeable parts according to exemplary embodiments.

DETAILED DESCRIPTION

Figure 1:
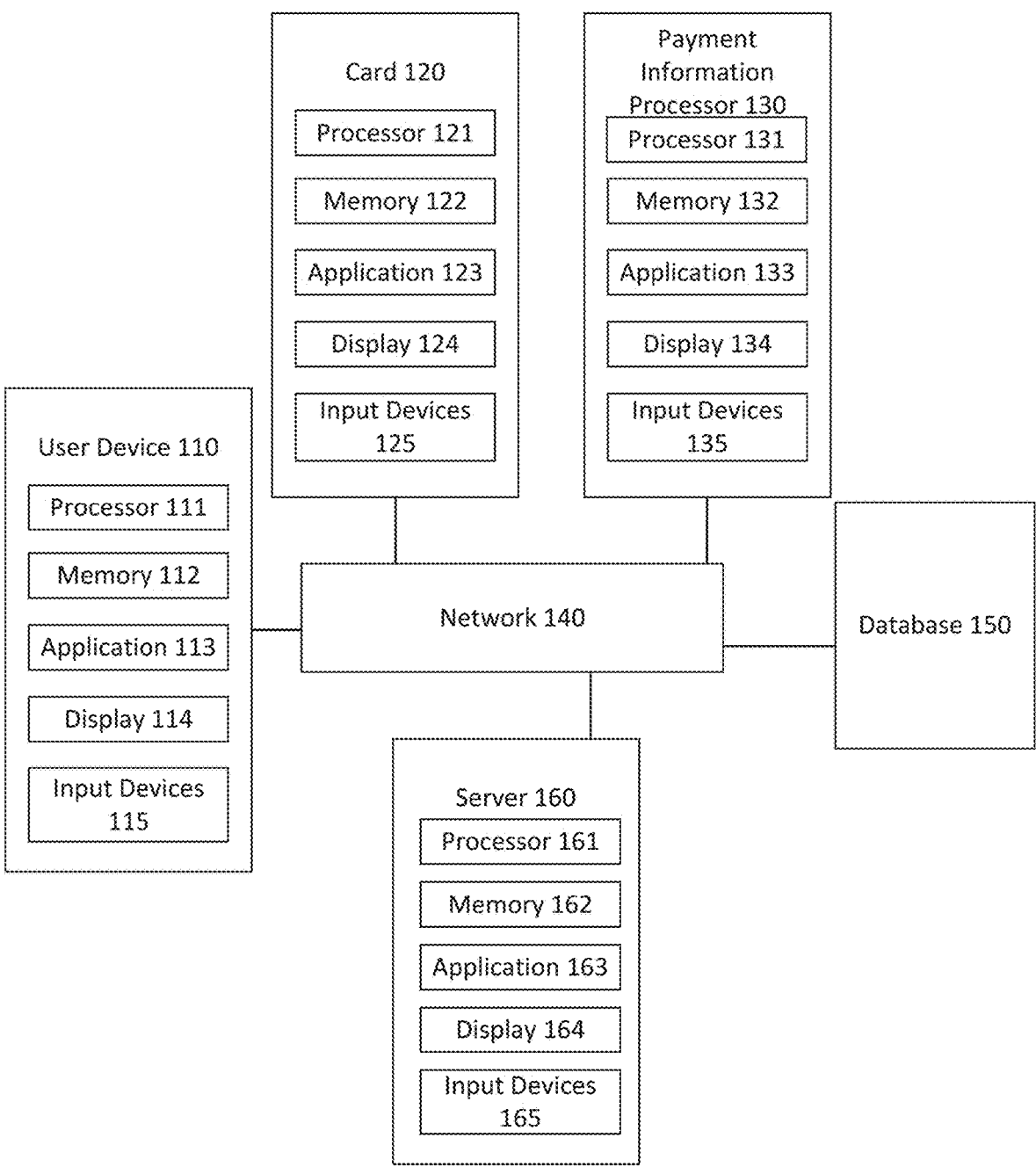
FIG. 1 is a block diagram of a system according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments. One skilled in the relevant art will understand that the described features, advantages, and characteristics of any embodiment can be interchangeably combined with the features, advantages, and characteristics of any other embodiment.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention relates generally to systems and methods for distributing a transaction among multiple parties. Generally, the system includes a user device application designed to receive payment information from multiple cards and transmit each payment information to a single selected card such that the selected card can request a payment processing server to split a bill or transaction among several parties associated with the cards. The user device application can open a first, second, or more NFC fields to receive the payment information from one or more contactless cards. The user device application then selects one of the cards and transmits the payment information of each contactless card to the selected card. Also, the application transmits a request to split or distribute the transaction among the non-selected cards. This request is designed to be transmitted to the payment processing server.

The present systems and methods provide significant improvements over conventional systems and methods. Primarily, the present systems and methods improve contactless cards by allowing them to quickly and easily receive the payment information of other contactless cards. Thus, the capability of the card is improved and expanded. Furthermore, the visual element on the card improves the card's ability to convey information to the user.

Additionally, these systems and methods replace conventional payment-sharing applications. Further, the present embodiments save time by supplanting the need for entering information into a payment-sharing application. Thus, frustration is avoided and human error is reduced.

As another improvement, these systems and methods improve efficiency and privacy by using one or more communication fields to sharing payment information and authenticate users. Sharing personal and financial information over the multiple communication fields ensures that third-party interference is avoided and that the transaction is done quickly and efficiently.

FIG. 1 illustrates a system 100 according to an exemplary embodiment. The system 100 may comprise a user device 110, a card 120, a payment information processor 130, a network 140, a database 150, and a server 160. Although FIG. 1 illustrates single instances of components of system 100, system 100 may include any number of components.

System 100 may include a user device 110. The user device 110 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. A wearable smart device can include without limitation a smart watch.

The user device 110 may include a processor 111, a memory 112, and an application 113. The processor 111 may be a processor, a microprocessor, or other processor, and the user device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at one point in time. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's private data and financial account information.

The application 113 may comprise one or more software applications, such as a mobile application and a web browser, comprising instructions for execution on the user device 110. In some examples, the user device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. Such processes may be implemented in software, such as software modules, for execution by computers or other machines. The application 113 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the user device 110 that is available and supported by the user device 110, such as a touch-screen, keyboard, mouse, cursor-control device, touch-screen, microphone, digital camera, video recorder or camcorder. These devices may be used to enter information and interact with the software and other devices described herein.

System 100 may include one or more contactless cards 120 which are further explained below with reference to FIG. 2 and FIG. 3. In some embodiments, contactless card 120 may be in wireless communication, utilizing NFC in an example, with user device 110.

System 100 may include a payment information processor 130. The payment information processor 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The payment information processor 130 may include a processor 131, a memory 132, and an application 133. The processor 131 may be a processor, a microprocessor, or other processor, and the payment information processor 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the payment information processor 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's private data and financial account information.

The application 133 may comprise one or more software applications comprising instructions for execution on the payment information processor 130. In some examples, the payment information processor 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The payment information processor 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the payment information processor 130 that can be available and supported by the payment information processor 130, such as a touch-screen, keyboard, mouse, cursor-control device, touch-screen, microphone, digital camera, video recorder or camcorder. These devices may be used to enter information and interact with the software and other devices described herein.

System 100 may include one or more networks 140. In some examples, the network 140 may be one or more of a wireless network, a wired network or any combination of wireless network and wired network, and may be configured to connect the user device 110, the contactless card 120, the payment information processor 130, the database 150 and the server 160. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, BLUETOOTH, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 160 or may be hosted externally of the server 160, such as by a server, by a cloud-based platform, or in any storage device that is in data communication with the server 160.

The server 160 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 160 may include a processor 161, a memory 162, and an application 163. The processor 161 may be a processor, a microprocessor, or other processor, and the server 160 may include one or more of these processors. The server 160 can be onsite, offsite, standalone, networked, online, or offline.

The processor 161 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 161 may be coupled to the memory 162. The memory 162 may be a read-only memory, write-once read-multiple memory or read/write memory, e.g., RAM, ROM, and EEPROM, and the server 160 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 162 may be configured to store one or more software applications, such as the application 163, and other data, such as user's private data and financial account information.

The application 163 may comprise one or more software applications comprising instructions for execution on the server 160. In some examples, the server 160 may execute one or more applications, such as software applications, that enable, for example, network communications with one or more components of the system 100, transmit and/or receive data, and perform the functions described herein. Upon execution by the processor 161, the application 163 may provide the functions described in this specification, specifically to execute and perform the steps and functions in the process flows described below. Such processes may be implemented in software, such as software modules, for execution by computers or other machines. The application 163 may provide GUIs through which a user may view and interact with other components and devices within system 100. The GUIs may be formatted, for example, as web pages in HyperText Markup Language (HTML), Extensible Markup Language (XML) or in any other suitable form for presentation on a display device depending upon applications used by users to interact with the system 100.

The server 160 may further include a display 164 and input devices 165. The display 164 may be any type of device for presenting visual information such as a computer monitor, a flat panel display, and a mobile device screen, including liquid crystal displays, light-emitting diode displays, plasma panels, and cathode ray tube displays. The input devices 165 may include any device for entering information into the payment information processor 130 that is available and supported by the payment information processor 130, such as a touch-screen, keyboard, mouse, cursor-control device, touch-screen, microphone, digital camera, video recorder or camcorder. These devices may be used to enter information and interact with the software and other devices described herein.

In some examples, exemplary procedures in accordance with the present disclosure described herein can be performed by a processing arrangement and/or a computing arrangement (e.g., a computer hardware arrangement). Such processing/computing arrangement can be, for example entirely or a part of, or include, but not limited to, a computer/processor that can include, for example one or more microprocessors, and use instructions stored on a non-transitory computer-accessible medium (e.g., RAM, ROM, hard drive, or other storage device). For example, a computer-accessible medium can be part of the memory of the user device 110, the card 120, the payment information processor 130, the network 140, the database 150, and the server 160 or other computer hardware arrangement.

In some examples, a computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
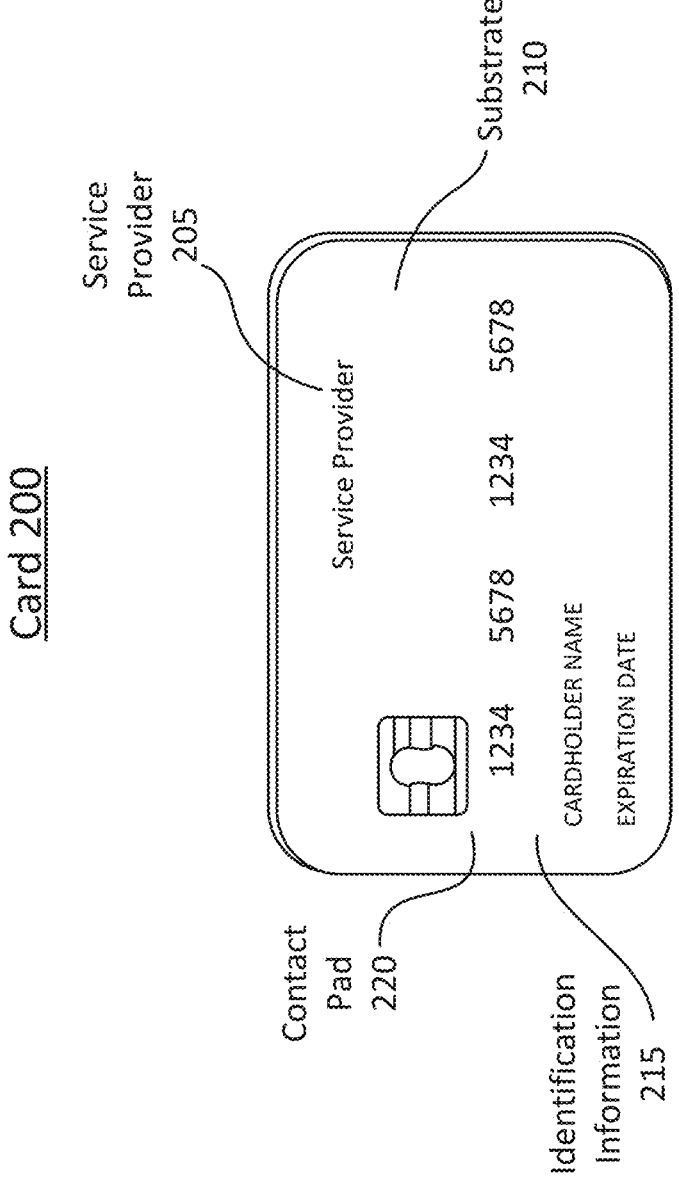
FIG. 2 illustrates a contactless card according to an exemplary embodiment.

FIG. 2 illustrates a contactless card 200 according to an exemplary embodiment. The contactless card 200 may comprise a payment card, such as a credit card, debit card, or gift card, issued by a service provider 205 displayed on the front or back of the card 200. In some examples, the payment card may comprise a dual interface contactless payment card. In some examples, the contactless card 200 is not related to a payment card, and may comprise, without limitation, an identification card, a membership card, a loyalty card, a transportation card, and a point of access card.

The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, smart watch, some other wearable device, or tablet computer. The contactless card 200 may also include processing circuitry, antenna and other components not shown in FIG. 2. These components may be located behind the contact pad 220 or elsewhere on the substrate 210. The contactless card 200 may also include a magnetic strip or tape, which may be located on the back of the card (not shown in FIG. 2).

Figure 3:
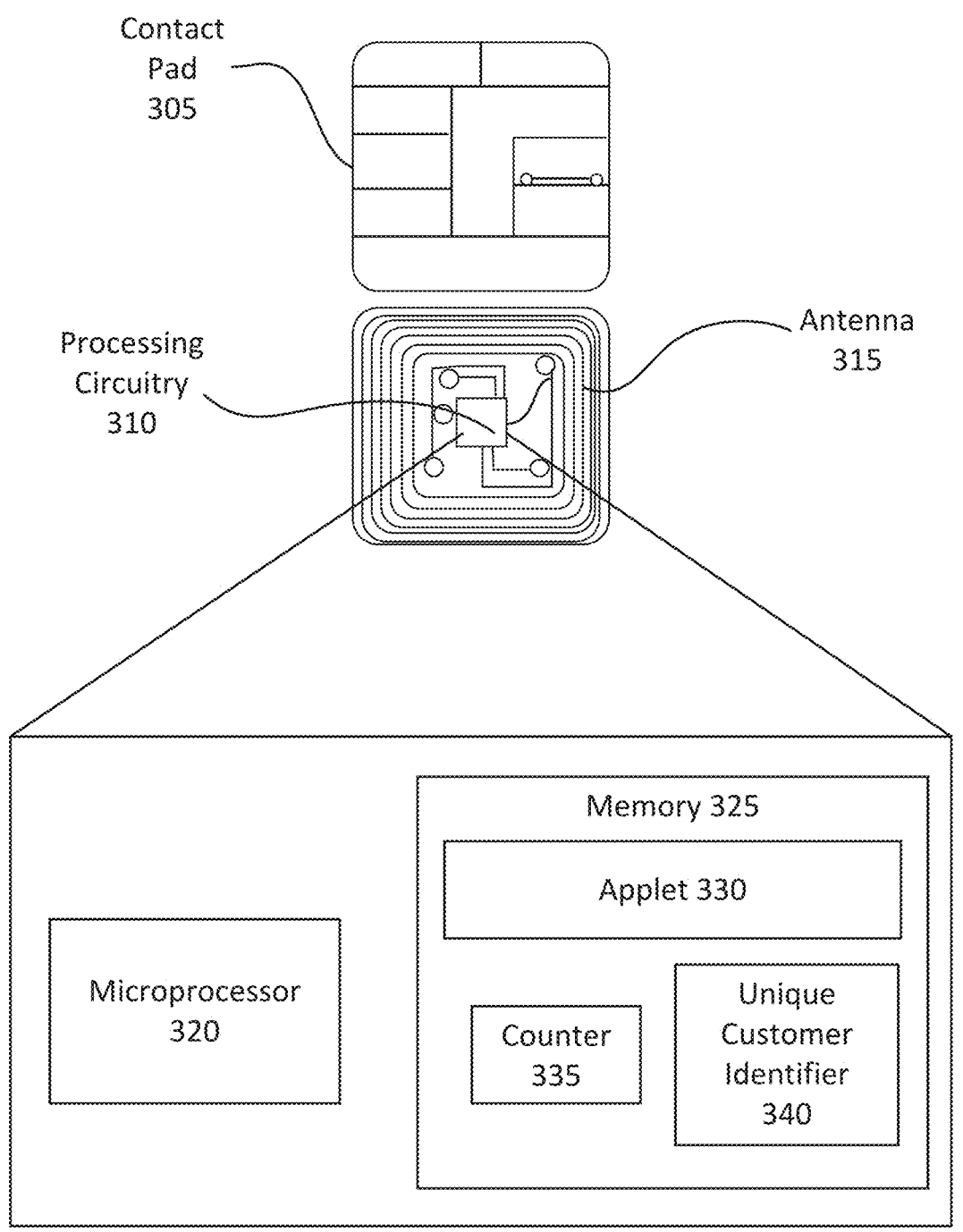
FIG. 3 illustrates a contactless card according to an exemplary embodiment.

FIG. 3 illustrates a contactless card 200 according to an exemplary embodiment.

As illustrated in FIG. 3, the contact pad 305 may include processing circuitry 310 for storing and processing information, including a microprocessor 320 and a memory 325. It is understood that the processing circuitry 310 may contain additional components, including processors, memories, error and parity/CRC checkers, data encoders, anticollision algorithms, controllers, command decoders, security primitives and tamperproofing hardware, as necessary to perform the functions described herein.

The memory 325 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 325 may be configured to store one or more applets 330, one or more counters 335, and a customer identifier 340. The one or more applets 330 may comprise one or more software applications configured to execute on one or more contactless cards, such as JAVA Card applet. However, it is understood that applets 330 are not limited to JAVA Card applets, and instead may be any software application operable on contactless cards or other devices having limited memory. The one or more counters 335 may comprise a numeric counter sufficient to store an integer. The customer identifier 340 may comprise a unique alphanumeric identifier assigned to a user of the contactless card 200, and the identifier may distinguish the user of the contactless card from other contactless card users. In some examples, the customer identifier 340 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 305 or entirely separate from it, or as further elements in addition to processor 320 and memory 325 elements located within the contact pad 305.

In some examples, the contactless card 200 may comprise one or more antennas 315. The one or more antennas 315 may be placed within the contactless card 200 and around the processing circuitry 310 of the contact pad 305. For example, the one or more antennas 315 may be integral with the processing circuitry 310 and the one or more antennas 315 may be used with an external booster coil. As another example, the one or more antennas 315 may be external to the contact pad 305 and the processing circuitry 310.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JAVA Card, and one or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

FIG. 4 illustrates a card 400 with a visual element. The contactless card 400 may comprise a payment card, such as a credit card, debit card, or gift card, issued by a service provider 405 displayed on the front or back of the card 400. In some examples, the payment card may comprise a dual interface contactless payment card. In some examples, the contactless card 400 is not related to a payment card, and may comprise, without limitation, an identification card, a membership card, a loyalty card, a transportation card, and a point of access card.

The contactless card 400 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 400 may have physical characteristics compliant with the ID-1 format of the ISO/IEC 7810 standard, and the contactless card may otherwise be compliant with the ISO/IEC 14443 standard. However, it is understood that the contactless card 400 according to the present disclosure may have different characteristics, and the present disclosure does not require a contactless card to be implemented in a payment card.

The contactless card 400 may also include identification information 415 displayed on the front and/or back of the card, and a contact pad 420. The contact pad 420 may be configured to establish contact with another communication device, such as a user device, smart phone, laptop, desktop, smart watch, some other wearable device, or tablet computer. The contactless card 400 may also include processing circuitry, antenna and other components not shown in FIG. 4. These components may be located behind the contact pad 420 or elsewhere on the substrate 410. The contactless card 400 may also include a magnetic strip or tape, which may be located on the back of the card (not shown in FIG. 4).

The contactless card 400 may also include a visual element 425. The visual element 425 can be connected to the contact pad 420 by a service bus. The visual element 425 can be any light-emitting element including without limitation one or more light emitting diodes (LEDs). In other embodiments, the visual element can include at least one of an organic light-emitting diodes (OLED), a polymer light-emitting diode, an active-matrix organic light-emitting diode (AMOLED), or quantum dot light emitting diode (QLED). The visual element 425 can be activated by one or more predetermined actions, including the receiving of one or more payment information from the user device application. Thus, the visual element 425 can indicate whether the contactless card 400 currently holds the payment information or is otherwise ready to transmit the payment information to the payment information processor or some other server. The user can, through the user device application, deactivate the visual element 425 by tapping the contactless card 400 to a user device via a communication field. In other embodiments, the visual element 425 can turn off once the card has transmitted the payment information and the distribution request to the payment information processor.

Figure 5:
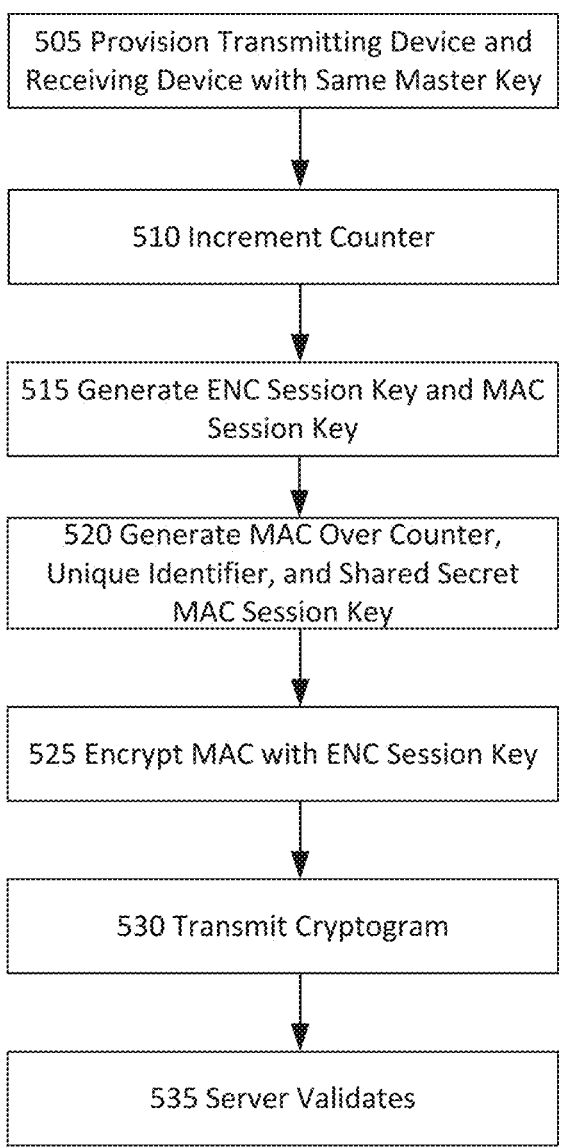
FIG. 5 is a flow chart of method of key diversification according to an exemplary embodiment.

FIG. 5 is a flow chart of method 500 of key diversification according to an exemplary embodiment.

In some examples, a sender and recipient may desire to exchange data via a transmitting device and a receiving device. In some embodiments, the transmitting device is the contactless card, and the receiving device is the server. In other embodiments, the transmitting device and the receiving device are network-enabled computers, as defined herein. As explained above, it is understood that one or more transmitting devices and one or more receiving devices may be involved so long as each party shares the same shared secret symmetric key. In some examples, the transmitting device and receiving device may be provisioned with the same master symmetric key. In other examples, the transmitting device may be provisioned with a diversified key created using the master key. In some examples, the symmetric key may comprise the shared secret symmetric key which is kept secret from all parties other than the transmitting device and the receiving device involved in exchanging the secure data. It is further understood that part of the data exchanged between the transmitting device and receiving device comprises at least a portion of data which may be referred to as the counter value. The counter value may comprise a number that changes each time data is exchanged between the transmitting device and the receiving device.

The transmitting device and the receiving device may be configured to communicate via NFC, BLUETOOTH, RFID, Wi-Fi, and/or the like. The transmitting device and the receiving device may be network-enabled computer devices. In some examples, the transmitting device may comprise a contactless card and the receiving device may comprise a server. In other examples, the receiving device may comprise a user device or a user device application.

The method 500 can begin with step 505. In step 505, a transmitting device and receiving device may be provisioned with the same master key, such as the same master symmetric key. The transmitting device may be the user device. The receiving device may be the contactless card. When the transmitting device is preparing to process the sensitive data with symmetric cryptographic operation, the transmitting device may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

In step 510, the transmitting device may take the selected cryptographic algorithm, and using the master symmetric key, process the counter value 335. For example, the transmitting device may select a symmetric encryption algorithm, and use a counter which updates with every conversation between the transmitting device and the receiving device The one or more counters 335 may comprise a numeric counter sufficient to store an integer. The transmitting device may increment the counter one or more times. In step 515, the transmitting device generates two session keys: one ENC (encryption) session key and one MAC (message authentication code) session key. The transmitting device may encrypt the counter value with the selected symmetric encryption algorithm using the master symmetric key to create a session key.

In step 520, the transmitting device generates the MAC over the counter 335, the unique customer identifier 340, and the shared secret MAC session key. The customer identifier 340 may comprise a unique alphanumeric identifier assigned to a user of the contactless card, and the identifier may distinguish the user of the contactless card from other contactless card users. In some examples, the customer identifier 340 may identify both a customer and an account assigned to that customer and may further identify the contactless card associated with the customer's account.

In step 525, the transmitting device encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data.

In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 530, the transmitting device transmits a cryptogram to the receiving device. The cryptogram can include the applet information 330, the unique customer identifier 340, the counter value 335, and the encrypted MAC.

In step 535, the receiving device validates the cryptogram. For example, the receiving device generates its own UDKs (unique diversified keys) using the unique customer identifier 340 and the master key. The unique customer identifier is derived from the validated cryptogram. Recall that the receiving device has already been provisioned with the master key. The receiving device generates two session keys: one ENC (encryption) session key and one MAC (message authentication code) session key. The receiving device may generate these session keys from the UDKs and the counter value. The counter value can be derived from the cryptogram. The receiving device uses the session keys to decrypt the MAC from the cryptogram sent by the transmitting device. The output of the encryptions may be the same diversified symmetric key values that were created by the sender. For example, the receiving device may independently create its own copies of the first and second diversified session keys using the counter. Then, the receiving device may decrypt the protected data using the second diversified session key to reveal the output of the MAC created by the transmitting device. The receiving device may then process the resultant data through the MAC operation using the first diversified session key. The receiving device validates the MAC with the MAC session key generated in step 515. The receiving device may validate the MAC over the unique customer identifier and the counter value.

Figure 6:
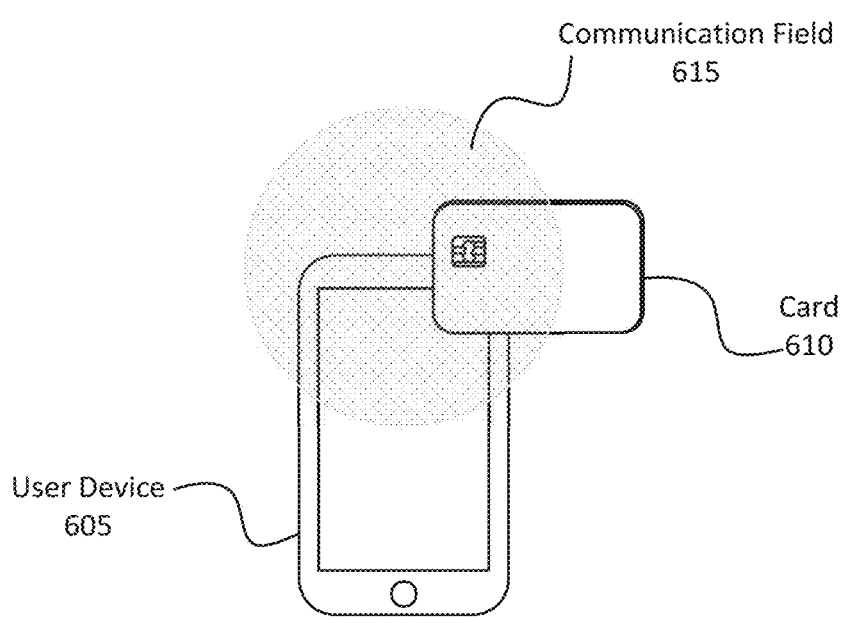
FIG. 6 is a diagram illustrating near field communication (NFC) according to an exemplary embodiment.

FIG. 6 is a diagram illustrating near field communication (NFC) according to an exemplary embodiment.

Generally, NFC is the transmission of data through electromagnetic radio fields which enable two or more devices to communicate with each other without touching. NFC operates at 13.56 MHz on ISO/IEC 18000-3 air interface and at rates ranging from 106 kbit/s to 424 kbit/s. When two NFC-enabled devices are placed within a very small distances (e.g. a few centimeters), they can perform a transaction of information. NFC is beneficial to consumer transactions because it allows for near instantaneous reading of information. The receiving device reads the transmitted data the instant that it is sent. Therefore, human error is greatly reduced. Additionally, NFC reduces the time need to read a card. Rather than swipe a card through a reader, a consumer can simply touch the card or user device to an NFC enabled reader. Additionally, NFC reduces the risk of interference from fraudulent parties. Because NFC devices may communicate only over a very short distance, it is extremely difficult to intercept the information being sent between the devices.

Some examples of NFC communication include NFC card emulation where smartphones act like smart cards allowing users to perform transactions such as payment. As another example, NFC reader/writer communication allows devices to read information stored on NFC tags embedded into labels or smart posters. As another example, NFC peer-to-peer communication allows two NFC-enabled devices to communicate with each other to exchange information.

NFC standards cover communications protocols and data exchange formats, and are based on existing RFID standards including ISO/IEC 14443 and FeliCa. The standards include ISO/IEC 18092 and those defined by the NFC Forum.

In FIG. 6, a user device 605 and a contactless card 610 are interacting within an NFC field 615. The user device is further explained with reference to FIG. 1. The contactless card is further explained with reference to FIGS. 2 and 3. Both the user device and contactless card may be enabled with NFC technology. The user and the card are in close contact with each other so that they can exchange information within the communication field.

Figures 7A, 7B:
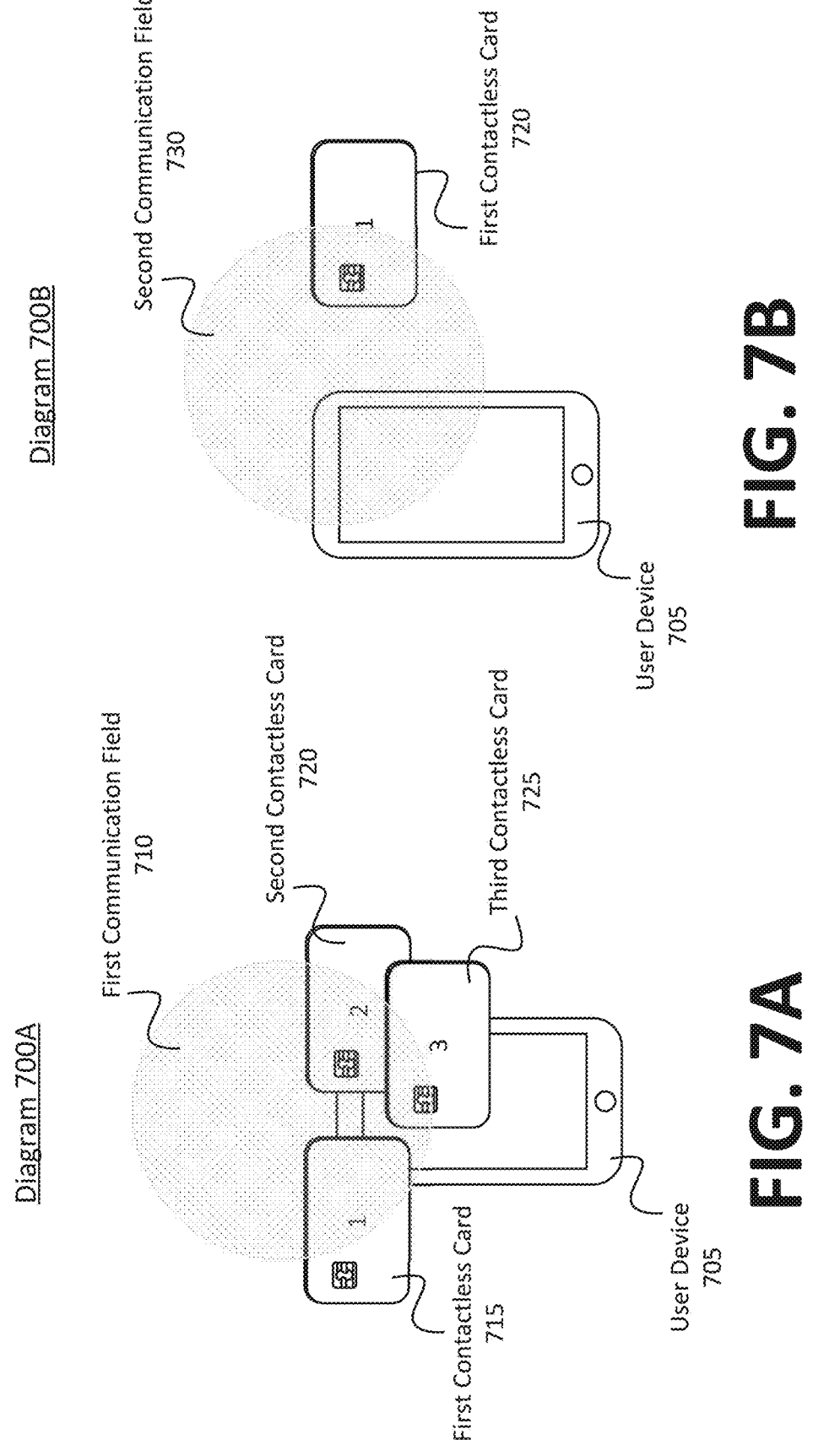
FIGS. 7A and 7B illustrate one or more contactless cards being tapped to a user device over a communication field according to an exemplary embodiment.

FIGS. 7A and 7B illustrate one or more contactless cards being tapped to a user device 705 over a communication field 710. Although FIGS. 7A and 7B depict the user device 705 as a cellphone, it is understood that in other embodiments the user device 705 may be any network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. A wearable smart device can include without limitation a smart watch.

The first communication field 710 and the second communication field 730 can be a communication field including without limitation NFC, BLUETOOTH, and RFID. NFC field are discussed with further reference to FIG. 6.

In FIG. 7A, the user device 705 can open a first communication field 710. This action can be performed by a processor. The first communication field 710 can allow a first contactless card 715, a second contactless card 720, and a third contactless card 725 to transmit each card's respective payment information to a user device application associated with the user device 705. The payment information can include without limitation an expiration date, security code, card verification value (CVV), a primary account number (PAN), and other identifying information. It is understood that although only three contactless cards are illustrated in FIG. 7A, more or fewer cards can be used. In some embodiments, only a first communication field 710 can be used to facilitate the transmission of payment information from the cards to the user device. In other embodiments, multiple communication fields can be opened. For example, a new communication field can be opened for each contactless card.

In FIG. 7B, the user device 705 has received the payment information from each contactless card. The user device 705 opens a second communication field 730 via a processor. The contactless card 720, or any of the contactless cards that has already transmitted its respective payment information to the user device 705, can enter the second communication field 730 and receive each of the payment information from the second contactless card 720 and the third contactless card 725. Furthermore, the selected card may activate a visual element indicating that the payment information and the request have been received by the selected card. The visual element is discussed with further reference to FIG. 4.

Figure 8:
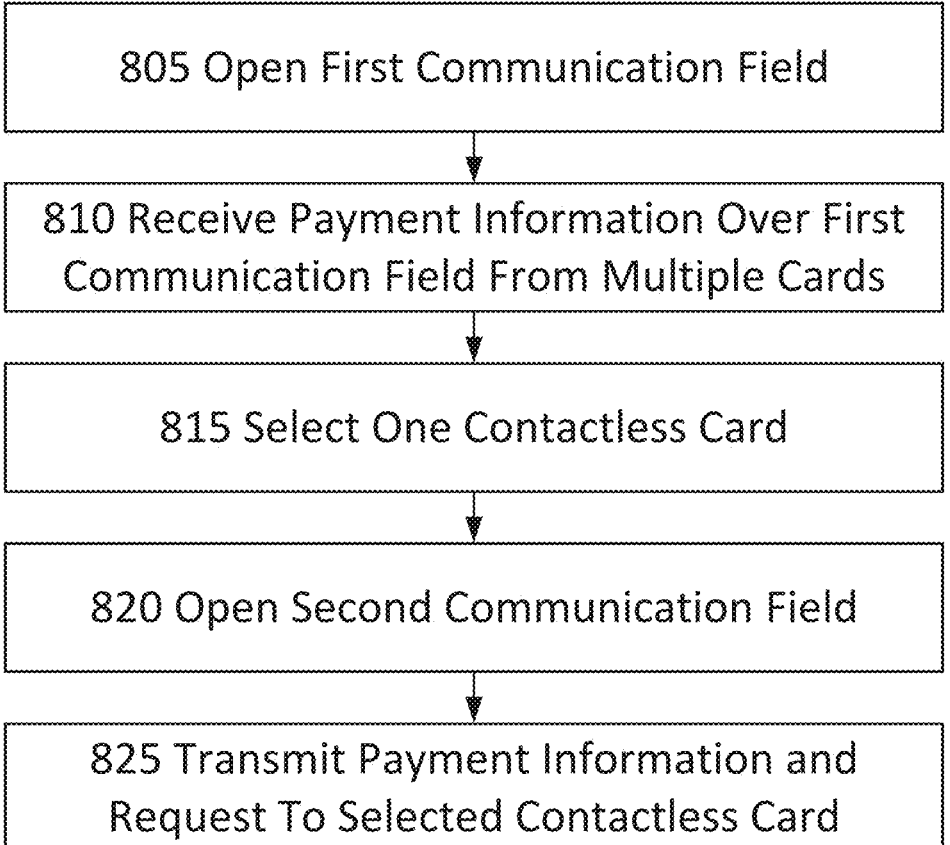
FIG. 8 describes a method for transmitting the payment information of multiple contactless cards to a single, selected contactless card according to an exemplary embodiment.

FIG. 8 describes a method for transmitting the payment information of multiple contactless cards to a single, selected contactless card. The process can include a user device, a user device application, and two or more contactless cards. Contactless cards are discussed with further reference to FIGS. 2 and 3.

The process 800 can being with action 805 in which the user device or user device application opens a first communication field. This action can be performed by a processor. Communication fields are discussed with further reference to FIGS. 6, 7A, and 7B. In action 810, the user device application can receive payment information over the communication field from multiple contactless cards. The multiple contactless cards may enter the communication filed one at a time, two at a time, all at once, or in any combination. In other embodiments, a separate communication field may be opened for each contactless card. The user device application can open the first communication field in response to a command entered by the user via the user device and/or user device application. In other embodiments, the user device application can open the communication field automatically in response to sensing the proximity of one or more contactless cards. For example, three contactless cards can be stacked on top of the user device. All three contactless cards can then transmit their own respective payment information to the user device application over the communication field. Having received the payment information from each card, the user device application in action 815 can select one of the contactless cards. This selection can be made in a variety of ways. For example, the user device application can select the contactless card that first enters the first communication field. As another nonlimiting example, the user device application may prompt the user to select via the user device which contactless card should be selected. As another nonlimiting example, the user device application may be configured such that it always selects a specific contactless card, for example the contactless card that belongs to a specific cardholder. Having selected a contactless card, the user device application in action 820 can open a second communication field via a processor. Over this second communication field, the user device application in action 825 can transmit the payment information of each non-selected card to the selected card. In addition, the user device application can also send a request including a request to distribute a transaction among each of the selected and non-selected contactless cards. The selected contactless card can be configured to transmit the payment information of each contactless card and the request to a payment information processor for further processing.

The request can further include a specific proportion by which to distribute the transaction. For example, the request may specify that the transaction should be split equally among one or more cards. In other embodiments, the request may specify that the transaction should be split favoring one card over others, e.g. 60% to one card, and 20% each to two other cards. This proportion can be specified by the user via the user device application, and the other cardholders can specify their preferred distribution with further reference to the process 1200 in FIG. 12.

Furthermore, the selected card may activate a visual element indicating that the payment information and the request have been received by the selected card. The visual element is discussed with further reference to FIG. 4.

In some embodiments, the user device application can generate a virtual card number (VCN) upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 9:
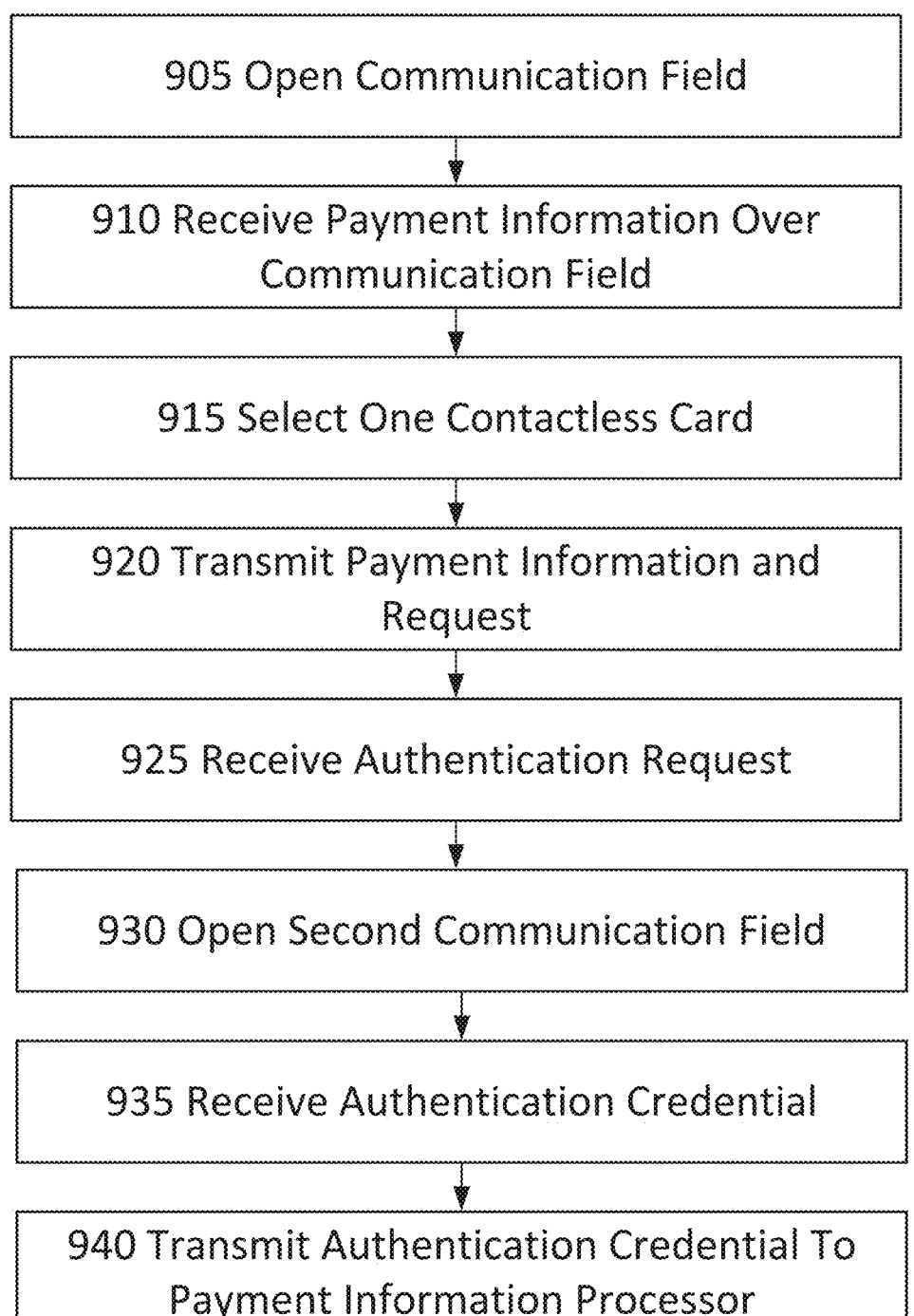
FIG. 9 illustrates a method for authenticating a user according to an exemplary embodiment.

FIG. 9 illustrates a method for authenticating a user according to an exemplary embodiment.

The process 900 can being with action 905 in which the user device or user device application opens a first communication field. This action can be performed by a processor. Communication fields are discussed with further reference to FIGS. 6, 7A, and 7B. In action 910, the user device application can receive payment information over the communication field from multiple contactless cards. The multiple contactless cards may enter the communication filed one at a time, two at a time, all at once, or any similar combination. In other embodiments, a separate communication field may be opened for each contactless card. The user device application can open the first communication field in response to a command entered by the user via the user device. In other embodiments, the user device application can open the communication field automatically in response to sensing the proximity of one or more contactless cards. For example, three contactless cards can be stacked on top of the user device. All three contactless cards can then transmit their own respective payment information to the user device application over the communication field.

Having received the payment information from each card, the user device application in action 915 can select one of the contactless cards. This selection can be made in a variety of ways. For example, the user device application can select the contactless card that first enters the first communication field. As another nonlimiting example, the user device application may prompt the user to select via the user device which contactless card should be selected. As another nonlimiting example, the user device application may be configured such that it always selects a specific contactless card, for example the contactless card that belongs to a specific cardholder.

Having selected a contactless card, the user device application in action 920 can open a second communication field via a processor. Over this second communication field, the user device application in action 920 can transmit the payment information of each non-selected card to the selected card. In addition, the user device application can also send a request including a request to distribute a transaction among each of the selected and non-selected contactless cards. The selected contactless card can be configured to transmit the payment information of each contactless card and the request to a payment information processor for further processing.

In action 925, the user device application can receive an authentication request from the payment information processor. The authentication request can be received over a wired or wireless network. Upon receiving this authentication request, the user device application in action 925 can open a second communication field. In action 935, the user device application can receive one or more authentication credentials to confirm the user's identity. The authentication credential can include without limitation: a password; personal identification number (PIN); biometric; passcode; card information; a message authentication code (MAC) discussed with further reference to FIG. 5; or other personal information. Having received the authentication credential, the user device application in action 940 can transmit the authentication credential to the payment information processor over a wired or wireless network. In some embodiments, the user device application can open another communication field over which it can send the authentication credential to the payment information processor.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 10:
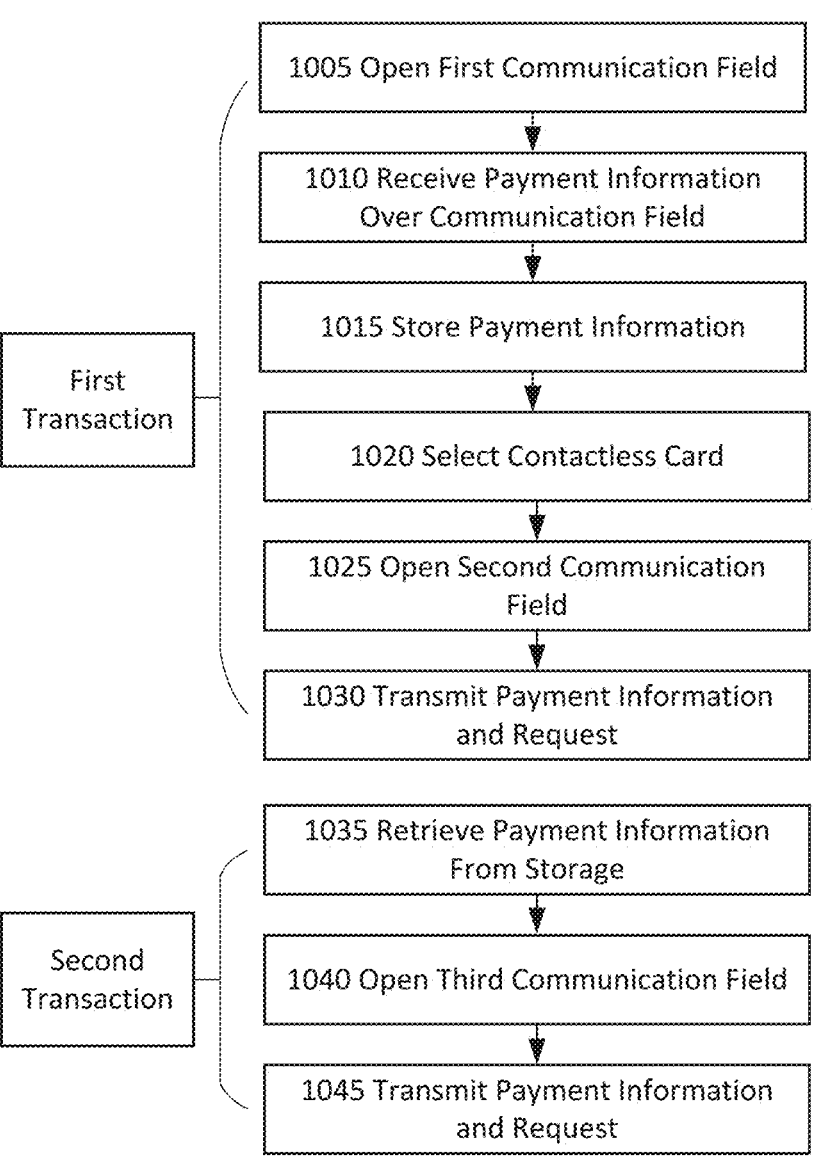
FIG. 10 is a method diagram illustrating a process for storing payment information according to an exemplary embodiment.

FIG. 10 is a method diagram illustrating a process for storing payment information according to an exemplary embodiment. The user device application can be configured to store one or more payment information from one or more contactless cards. By storing the payment information, the user device application can transmit the payment information to the selected card without having to tap each individual non-selected card to the user device. This makes subsequent transactions easier to split among the cardholders.

The process 1000 can being with action 1005 in which the user device or user device application opens a first communication field. This action can be performed by a processor. Communication fields are discussed with further reference to FIGS. 6, 7A, and 7B. In action 1010, the user device application can receive payment information over the communication field from multiple contactless cards. The multiple contactless cards may enter the communication filed one at a time, two at a time, all at once, or any similar combination. In other embodiments, a separate communication field may be opened for each contactless card. The user device application can open the first communication field in response to a command entered by the user via the user device. In other embodiments, the user device application can open the communication field automatically in response to sensing the proximity of one or more contactless cards. For example, the contactless cards can be stacked on top of the user device. All contactless cards can then transmit their own respective payment information to the user device application over the communication field. Having received the payment information from each contactless card, the user device application in action 1015 can store the payment information in a database, memory, or other data storage unit. The payment information can be stored long-term, i.e. for later use.

Having stored the payment information from each contactless card, the user device application in action 1020 can select one of the contactless cards. This selection can be made in a variety of ways. For example, the user device application can select the contactless card that first enters the first communication field. As another nonlimiting example, the user device application may prompt the user to select via the user device which contactless card should be selected. As another nonlimiting example, the user device application may be configured such that it always selects a specific contactless card, for example the contactless card that belong to a specific cardholder. Having selected a contactless card, the user device application in action 1025 can open a second communication field via a processor. Over this second communication field, the user device application in action 1030 can transmit the payment information of each non-selected card to the selected card. In addition, the user device application can also send a request including a request to distribute a transaction among each of the selected and non-selected contactless cards. The selected contactless card can be configured to transmit the payment information of each contactless card and the request to a payment information processor for further processing. The distribution of the payment is discussed with further reference to FIG. 12.

In a second transaction, the user might want to split costs among the same cardholders from the first transaction. In action 1035, the user device application can retrieve the payment information from one or more cardholders from the first transaction. This action can be performed by the processor. The processor can retrieve the payment information from the database, memory, or data storage unit. Next, the user device application in action 1040 can open a third communication field and in action 1045 transmit the payment information to the original contactless card. It is understood that the process 1000 may include one or more authentication requests and one or more authentication credentials discussed with further reference to FIG. 9. The authentication credential can include without limitation: a password; PIN; biometric; passcode; card information; a message authentication code (MAC) discussed with further reference to FIG. 5; or other personal information.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

FIG. 11 is a method diagram illustrating the process 1100 for requesting authentication credentials from one or more cardholders according to an exemplary embodiment. The process 1100 can being with action 1105 in which the user device or user device application opens a first communication field. This action can be performed by a processor. Communication fields are discussed with further reference to FIGS. 6, 7A, and 7B.

In action 1110, the user device application can receive payment information over the first communication field from multiple contactless cards. The multiple contactless cards may enter the communication filed one at a time, two at a time, all at once, or any similar combination. In other embodiments, a separate communication field may be opened for each contactless card. The user device application can open the first communication field in response to a command entered by the user via the user device application. In other embodiments, the user device application can open the communication field automatically in response to sensing the proximity of one or more contactless cards. For example, the contactless cards can be stacked on top of the user device. All the contactless cards can then transmit their own respective payment information to the user device application over the communication field.

Having received the payment information from each contactless card, the user device application in action 1115 can select one of the contactless cards. This selection can be made in a variety of ways. For example, the user device application can select the contactless card that first enters the first communication field. As another nonlimiting example, the user device application may prompt the user to select which contactless card should be selected. As another non-limiting example, the user device application may be configured such that it always selects a specific contactless card, for example the contactless card that belong to a specific cardholder.

In action 1120, the user device application can transmit an authentication request to one or more user device applications associated with the cardholders of the non-selected card. These authentication requests can be transmitted over a wired or wireless network. In some embodiments, the authentication request can be transmitted over another communication field between the user device application and the cardholders' user device applications.

In response, the user device application in action 1125 can receive one or more authentication credentials from the one or more user devices associated with the cardholders. The authentication credential can include without limitation: a password; PIN; biometric; passcode; card information; a message authentication code (MAC) discussed with further reference to FIG. 5; or other personal information.

The user device application in action 1130 can open a second communication field. In action 1135 the user device application can transmit the payment information and request to the selected contactless card. The request includes a request to distribute a transaction among each of the selected and non-selected contactless cards. The selected contactless card can be configured to transmit the payment information of each contactless card and the request to a payment information processor for further processing.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 12:
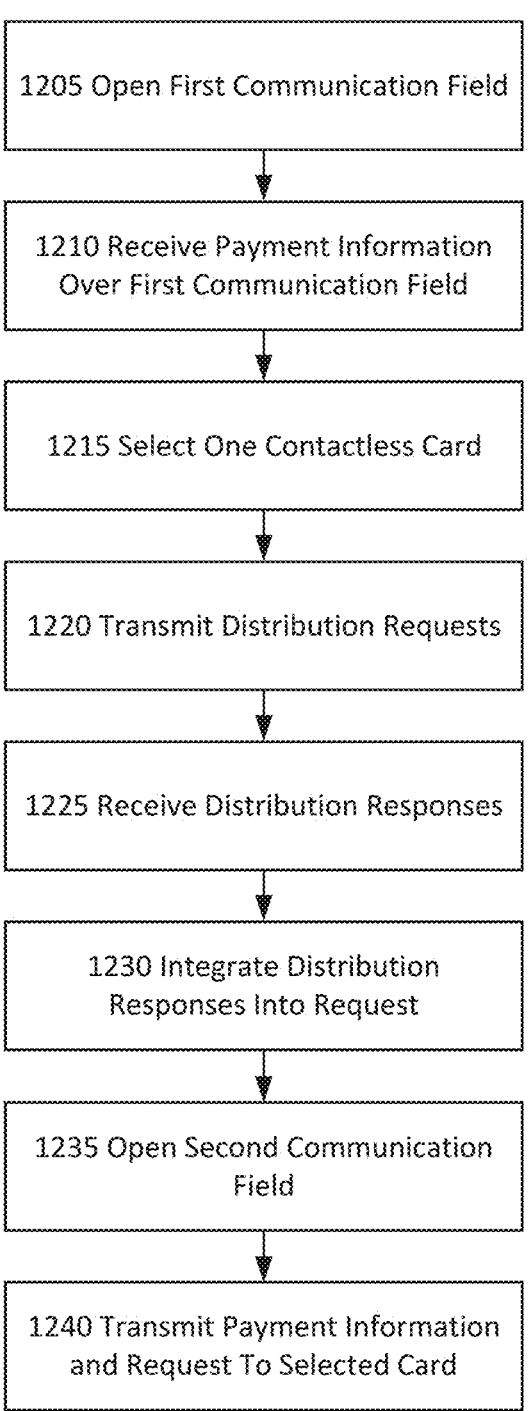
FIG. 12 is a method diagram illustrating a process for a user device application to split a transaction according to an exemplary embodiment.

FIG. 12 is a method diagram illustrating a process 1200 for a user device application to split a transaction according to an exemplary embodiment. FIG. 12 illustrates an exemplary embodiment of how the cardholders can, through their respective user devices and user device applications, provide a distribution response that can accept, amend, or reject a distribution request.

The process 1200 can being with action 1205 in which the user device or user device application opens a first communication field. This action can be performed by a processor. Communication fields are discussed with further reference to FIGS. 6, 7A, and 7B.

In action 1210, the user device application can receive payment information over the communication field from multiple contactless cards. The multiple contactless cards may enter the communication filed one at a time, two at a time, all at once, or any similar combination. In other embodiments, a separate communication field may be opened for each contactless card. The user device application can open the first communication field in response to a command entered by the user via the user device. In other embodiments, the user device application can open the communication field automatically in response to sensing the proximity of one or more contactless cards. For example, the contactless cards can be stacked on top of the user device. All the contactless cards can then transmit their own respective payment information to the user device application over the communication field.

Having received the payment information from each contactless card, the user device application in action 1215 can select one of the contactless cards. This selection can be made in a variety of ways. For example, the user device application can select the contactless card that first enters the first communication field. As another nonlimiting example, the user device application may prompt the user to select via the user device which contactless card should be selected. As another nonlimiting example, the user device application may be configured such that it always selects a specific contactless card, for example the contactless card that belong to a specific cardholder.

Having selected a contactless card, the user device application in action 1220 can transmit one or more distribution requests to the one or more non-selected contactless cards. The distribution requests can include without limitation an amount-to-be-paid associated with one or more transactions and an offer to split the amount-to-be-paid according to a given proportion. For example, the distribution request can indicate that the amount-to-be-paid is $200 split evenly among four cardholders, i.e. each cardholder pays $50. In response, the user device application can receive one or more distribution responses in action 1225. The distribution responses can include an acceptance of the given distribution request; an amendment to the request; or a total rejection of the request. For example, a cardholder might accept that he will pay $50 out of the total $200 transaction. In another nonlimiting example, a cardholder might amend the distribution request, responding with his preferred distribution of $40. In another nonlimiting example, a cardholder might reject the distribution request, responding that he will not pay any of the $200 transaction. Having received a distribution response from each cardholder or user device associated with each cardholder, the user device application in action 1230 can integrate the distribution response into the request that will ultimately be sent to the contactless card. The request includes a request to distribute a transaction among each of the selected and non-selected contactless cards. In action 1235, the user device application opens a second communication field via a processor. In action 1240 the user device application can transmit the payment information and request to the selected contactless card. The request includes a request to distribute a transaction among each of the selected and non-selected contactless cards. The selected contactless card can be configured to transmit the payment information of each contactless card and the request to a payment information processor for further processing.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

FIGS. 13A-13C are diagrams illustrating a contactless card with a connecting element and interchangeable parts according to an exemplary embodiment. A contactless card 1300 can comprise one or more sections including without limitation a first payment section 1305, a first non-payment section 1310, and second non-payment section 1315. Though not explicitly depicted in FIGS. 13A-13C, it is understood that the contactless card 1300 may have any or all elements described in FIGS. 2-4.

The first payment section 1305 can include a first contact pad 1306 which is enabled to receive and transmit payment information from one or more contactless cards, servers, payment processor, or user device applications. In other embodiments, the contactless card 1300 can include one or more payment sections not otherwise illustrated in FIGS.

13A-13C. In other embodiments, the contactless card 1300 may include a different number of sections than those depicted. For example, the card 1300 may have only two sections, but in other embodiments it may have four, five, or any number of sections. In some embodiments, each section can be a payment section. That is, each section can include a contact pad or some element configured to receive or transmit payment information. The first payment section 1305, first non-payment section 1310, and the second non-payment section 1315 can be connected by a connecting element 1340. The connecting element 1340 can include a snap and buttonhole arrangement such that the snaps of any card section can be mated with the buttonholes on another section. It is understood that the connecting element 1340 can connect one or more card sections together temporarily. In other embodiments the connecting element can comprise a buckle assembly, key and keyhole assembly or magnetic assembly. Furthermore, the contactless card 1300 may activate a visual element indicating that the payment information and the request have been received by the selected card. The visual element is discussed with further reference to FIG. 4.

The first non-payment section 1310 and the second non-payment section 1315 can be removed from the first payment section 1305. This action can be performed by pulling the sections apart manually. In some embodiments, the contactless card 1300 may require the user to provide an authentication credential before allowed each section to separate. Having removed the first non-payment section 1310 and a second non-payment section 1315, the user can connect one or more payment sections from other contactless card to the first payment section 1305 via the connecting element 1340. As illustrated, a second payment section 1320 and a third payment section 1330 can be connected to the first payment section 1305 via the connecting element 1340. The second payment section 1320 can include a second contact pad 1325, and the third payment section 1330 can include a third contact pad 1345. Once they are connected to the first payment section 1305, the second contact pad 1325 and the third contact pad 1345 can transmit one or more payment information to the first contact pad 1306. For example, the second contact pad 1325 can transmit the payment information associated with a second contactless card, and the third contact pad 1345 can transmit the payment information associated with a third contactless card. The payment information can include without limitation an expiration date, security code, card verification value (CVV), a primary account number (PAN), and other identifying information. The payment information can be transmitted over one or more connections 1335 connecting the first contact pad 1306 to the second contact pad 1325 and third contact pad 1345.

It is understood that contemplated embodiments are not limited to the number and orientations of card sections illustrated in FIG. 13A-13C. In other embodiments, more or less card sections may be used. Furthermore, the orientation and connection of each card section may be different than depicted.

Figure 13D:
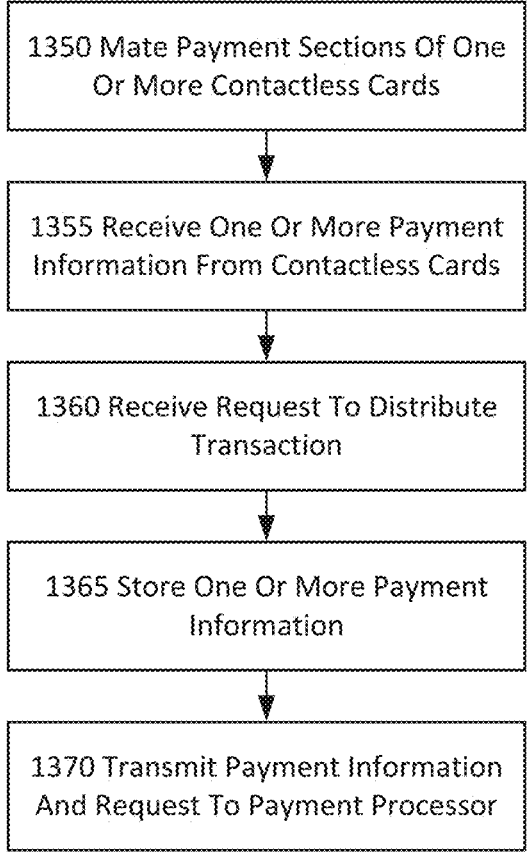

FIG. 13D is a method flowchart illustrating a process according to an exemplary embodiment. The process can include the one or more contactless cards with connecting elements described in FIGS. 13A-13C. The contactless cards can have some or all of the elements described in the contactless cards discussed with further reference to FIGS. 2-3. The actions can be performed by a processor associated with a first contactless card. In action 1350, the one or more contactless cards can be mated together. In action 1355, the first contactless cad can receive one or more payment information from each of the contactless cards via the connections between the contact pads described with reference to FIG. 13C. The payment information can include without limitation an expiration date, security code, card verification value (CVV), a primary account number (PAN), and other identifying information. In action 1360, the first contactless card can receive a request to distribute a transaction among the first contactless card and the other contactless cards which transmitted their payment information. This action can be received from one of the other contactless cards, a user device application, a server, or a payment processor via wired connection, wireless connection, or communication field. In other embodiments, the contactless card can retrieve the request from the card's own memory. Having received the payment information, in action 1365 the contactless card can store the one or more payment information in a memory associated with the contactless card. The memory of the card is discussed with further reference to FIGS. 2-3. In some embodiments, the first contactless card can transmit the payment information to a memory, database, or data storage unit associated with a user device or server via a wired connection, wireless connection, or some communication field including NFC, BLUETOOTH, or RFID. Next, in action 1370 the first contactless card can transmit the one or more payment information and request to a payment processor via a wired connection, wireless connection, or some communication field including NFC, BLUETOOTH, or RFID.

It is understood that the methods discussed elsewhere in the Figures—including without limitation splitting up a transaction into equal and unequal proportions, tapping one or more cards to a phone, selecting which card to receive the request, and requesting authentication credentials—can be applied to the systems and methods described in FIGS. 13A-13D.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 14A:
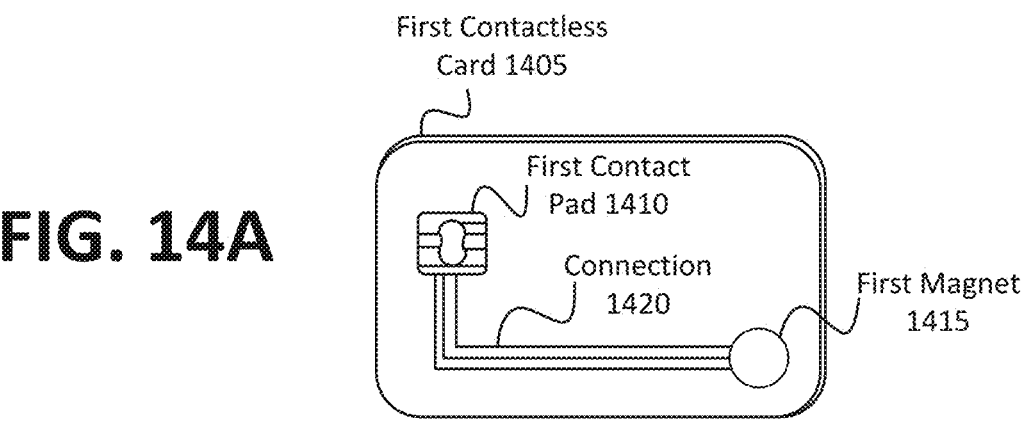
FIGS. 14A-14C illustrate one or more contactless cards with a magnet according to exemplary embodiments.

FIG. 14A illustrates a first contactless card 1405 with at least a first magnet 1415 connected to at least a first contact pad 1410 via a connection 1420 according to an exemplary embodiment. The first magnet 1415 can be configured to mate by magnetic force one or more other magnets on one or more other contactless cards. Furthermore, the first magnet 1415 can be configured to receive information from other contactless cards via the one or more magnets via the one or more contactless cards. The contactless card 1405 can have some or all of the elements described in the contactless cards discussed with further reference to FIGS. 2-3. In some embodiments, the contactless card 1405 can have one or more magnets, one or more contact pads, and one or more connections. It is understood that the first magnet 1415 and the connection 1420 may be visible on one or more faces of the contactless card. In other embodiments, the first magnet 1415 and the connection 1420 may be underneath one of the faces of the first contactless card 1405. Furthermore, the first contactless card may activate a visual element indicating that the payment information and the request have been received by the selected card. The visual element is discussed with further reference to FIG. 4.

Figure 14B:
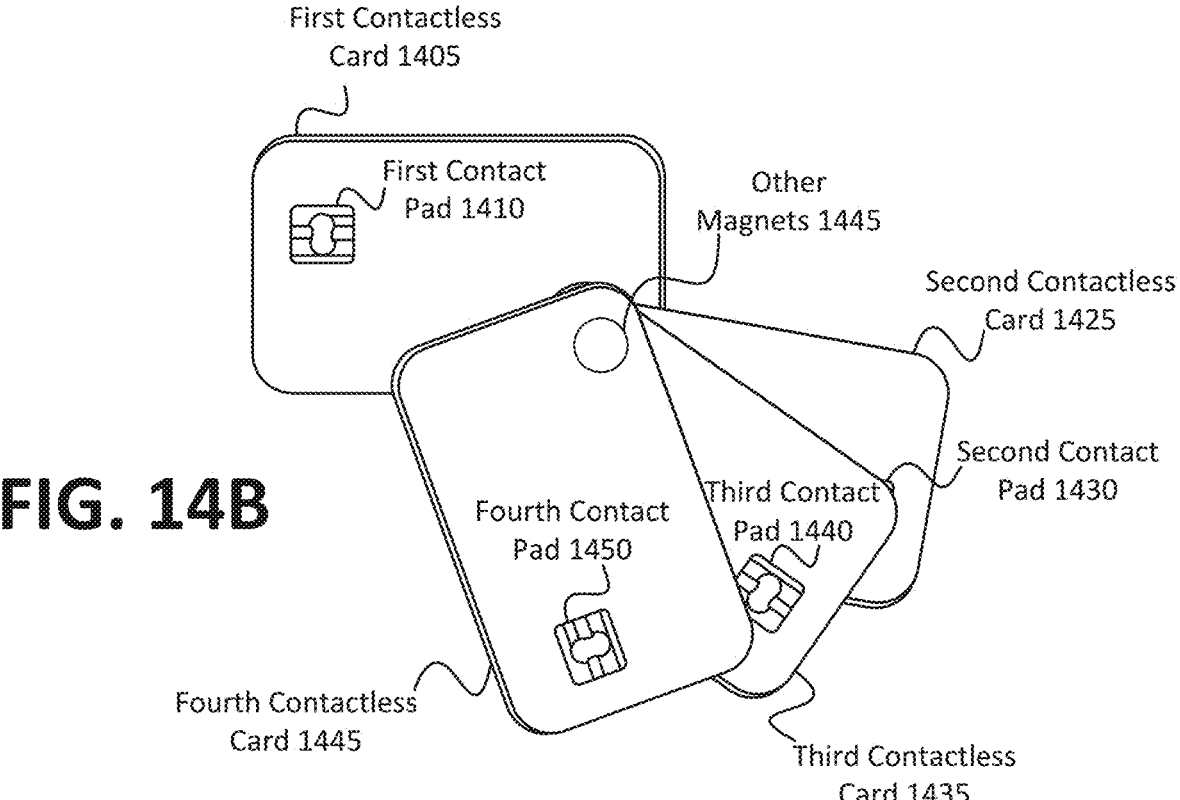

FIG. 14B illustrates one or more contactless cards connecting with the first contactless card 1405 via the first magnet 1415 according to an exemplary embodiment. Although not depicted explicitly in FIG. 14B, one or more connections are understood to connect the magnet and contact pads of each contactless card. Each magnet-including the first magnet 1415 and the other magnets 1445—are configured the same way as described in FIG. 14A. For example, the first contactless card 1405 can mate magnetically with a second contactless card 1425, a third contactless card 1435, and a fourth contactless card 1445. Each of the contactless cards can have one or more magnets, and each can have one or more contact pads such as a first contact pad 1410, second contact pad 1430, a third contact pad 1440, and a fourth contact pad 1450. The second, third, and fourth contactless cards (1425, 1435, and 1445 respectively) can mate with the first contactless card 1405 and transmit one or more payment information to the first contactless card 1405 and/or the first contact pad 1410. The payment information can include without limitation an expiration date, security code, card verification value (CVV), a primary account number (PAN), and other identifying information.

Figure 14C:
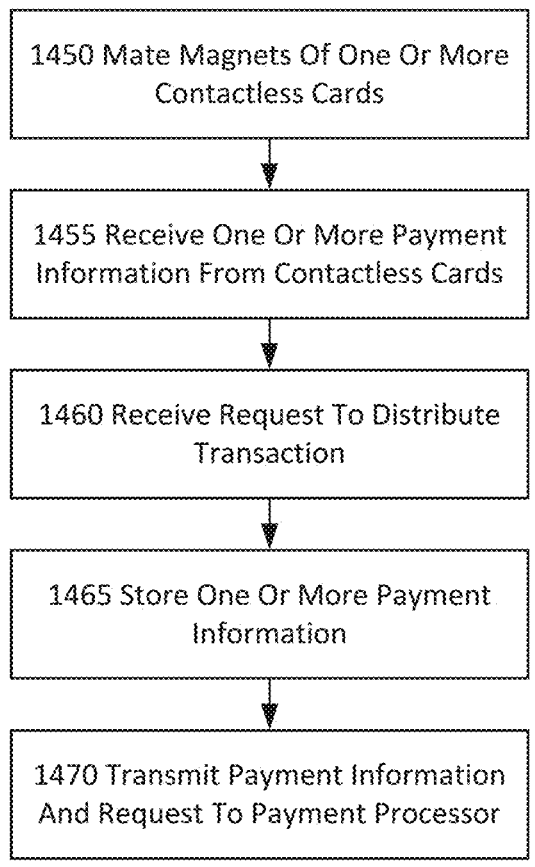

FIG. 14C is a method flowchart illustrating a process according to an exemplary embodiment. The process can include the one or more contactless cards with magnets described in FIGS. 14A-14B. The contactless cards can have some or all of the elements described in the contactless cards discussed with further reference to FIGS. 2-3. The actions can be performed by a processor associated with a first contactless card.

In action 1450, the magnets of one or more contactless cards can be mated together. In action 1455, the first contactless cad can receive one or more payment information from each of the contactless cards via the magnets. The payment information can include without limitation an expiration date, security code, card verification value (CVV), a primary account number (PAN), and other identifying information.

In action 1460, the first contactless card can receive a request to distribute a transaction among the first contactless card and the other contactless cards which transmitted their payment information. This action can be received from one of the other contactless cards, a user device application, a server, or a payment processor via wired connection, wireless connection, or communication field. In other embodiments, the contactless card can retrieve the request from the card's own memory. Having received the payment information, in action 1465 the contactless card can store the one or more payment information in a memory associated with the contactless card. The memory of the card is discussed with further reference to FIGS. 2-3. In some embodiments, the first contactless card can transmit the payment information to a memory, database, or data storage unit associated with a user device or server via a wired connection, wireless connection, or some communication field including NFC, BLUETOOTH, or RFID. Next, in action 1470 the first contactless card can transmit the one or more payment information and request to a payment processor via a wired connection, wireless connection, or some communication field including NFC, BLUETOOTH, or RFID.

It is understood that the methods discussed elsewhere in the Figures-including without limitation splitting up a transaction into equal and unequal proportions, tapping one or more cards to a phone, selecting which card to receive the request, and requesting authentication credentials—can be applied to the systems and methods described in FIGS. 14A-14C.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 15A:
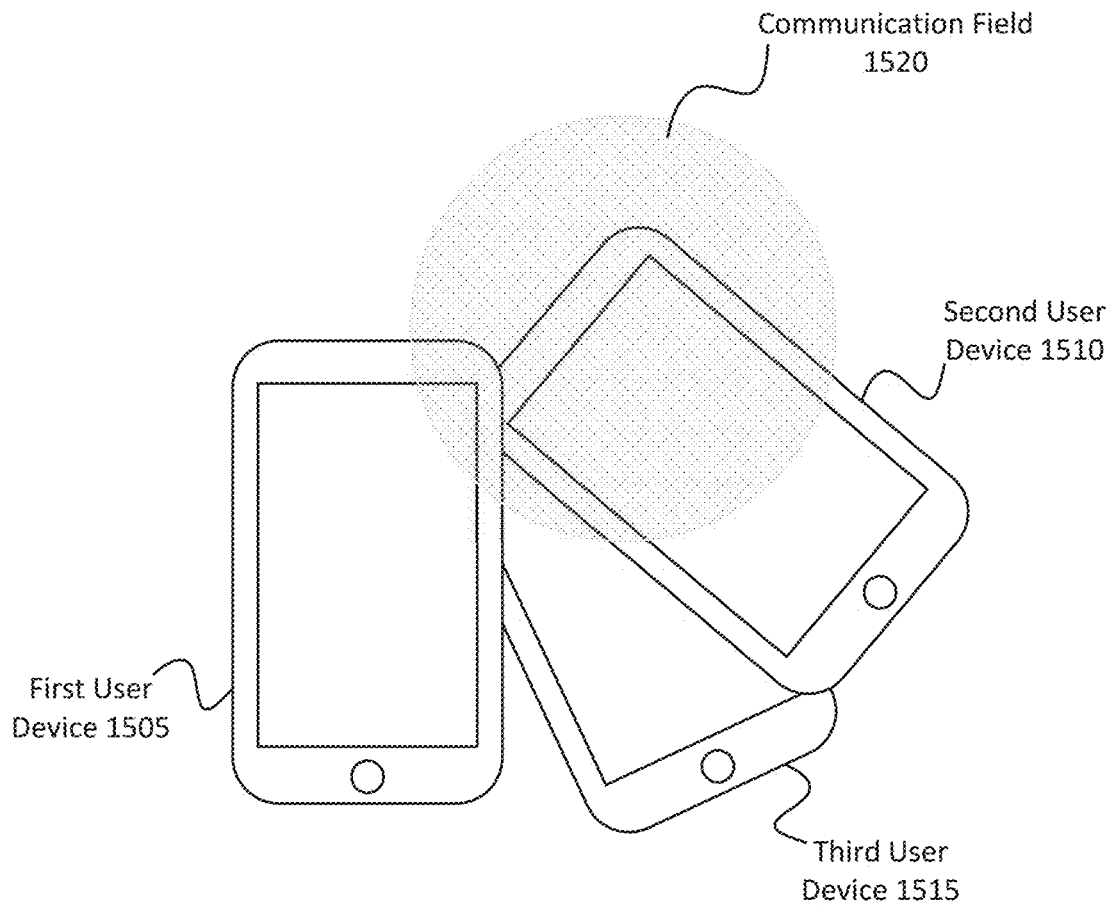
FIGS. 15A-15B illustrate a system and method for distributing a transaction among one or more user device applications according to exemplary embodiments.

FIG. 15A illustrates a process for distributing a transaction according to an exemplary embodiment. The process can include a first user device 1505, a second user device 1510, and a third user device 1515. It is understood that more or fewer user device can be used in other embodiments. The user devices are discussed with further reference to FIG. 1. Although FIG. 15A depicts the user devices as mobile devices, it is understood that in other embodiments the user devices can be wearable devices such as smart watches, smart tablets, computers, laptops, or other smart computer-enabled devices. Each user device can be provisioned with a user device application.

The first user device 1505 can open at least one communication field 1520. The communication field can be without limitation an NFC, BLUETOOTH, or RFID field. Communications fields are discussed with further reference to FIG. 6. Although just one communication field is depicted in FIG. 15A, it is understood that multiple communication fields can be opened. As a nonlimiting example, the first user device 1505 can open a new communication field for every second, third, fourth, etc. user device. Then, the second user device 1510 and the third user device 1515 can enter the communication field 1520. The second user device 1510 and the third user device 1515 can transmit, over the communication field, payment information. The payment information can include without limitation an expiration date, security code, card verification value (CVV), a primary account number (PAN), and other identifying information.

Figure 15B:
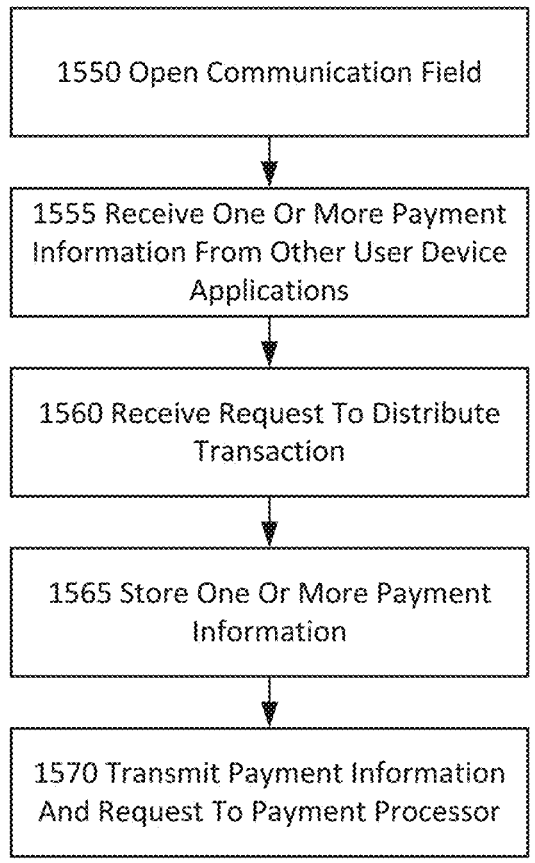

FIG. 15B is a method flowchart illustrating a process according to an exemplary embodiment. The process can include the user devices and communication fields discussed with further reference to FIG. 15A. In some embodiments, the actions can be performed by a processor associated with a user device. In other embodiments, the actions can be performed by a user device application associated with a user device.

In action 1550, a first user device application can open at least one communication field. The communication field can be without limitation an NFC, BLUETOOTH, or RFID. Communications fields are discussed with further reference to FIG. 6. Although just one communication field is discussed in FIG. 15B, it is understood that multiple communication fields can be opened. As a nonlimiting example, the first user device application can open a new communication field for every second, third, fourth, etc. user device. One or more user devices can enter the communication field, each of which can have its own user device application. In action 1555, the first user device application can receive one or more payment information from the one or more other user device applications associated with the one or more user devices that entered the communication field. The payment information can include without limitation an expiration date, security code, card verification value (CVV), a primary account number (PAN), and other identifying information.

In action 1560, the first user device application can receive a request to distribute a transaction among the first user device application and the other user device applications which transmitted their payment information. This action can be received from one of the other contactless cards, a user device application, a server, or a payment processor via wired connection, wireless connection, or communication field. In other embodiments, the contactless card can retrieve the request from the card's own memory. Having received the payment information, in action 1565 the first user device application can store the one or more payment information in a memory associated with the first user device application and/or the associated first user device. The memory of the card is discussed with further reference to FIGS. 2-3. In some embodiments, the first user device application can transmit the payment information to a memory, database, or data storage unit associated with a user device or server via a wired connection, wireless connection, or some communication field including NFC, BLUETOOTH, or RFID. Next, in action 1570 the first user device application can transmit the one or more payment information and request to a payment processor via a wired connection, wireless connection, or some communication field including NFC, BLUETOOTH, or RFID.

In some embodiments, the first user device can request and receive authentication credentials from other user device applications. Furthermore, it is understood that the methods discussed elsewhere in the Figures—including without limitation splitting up a transaction into equal and unequal proportions, tapping one or more cards to a phone, selecting which card to receive the request, and requesting authentication credentials—can be applied to the systems and methods described in FIGS. 15A and 15B.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

Figure 16A:
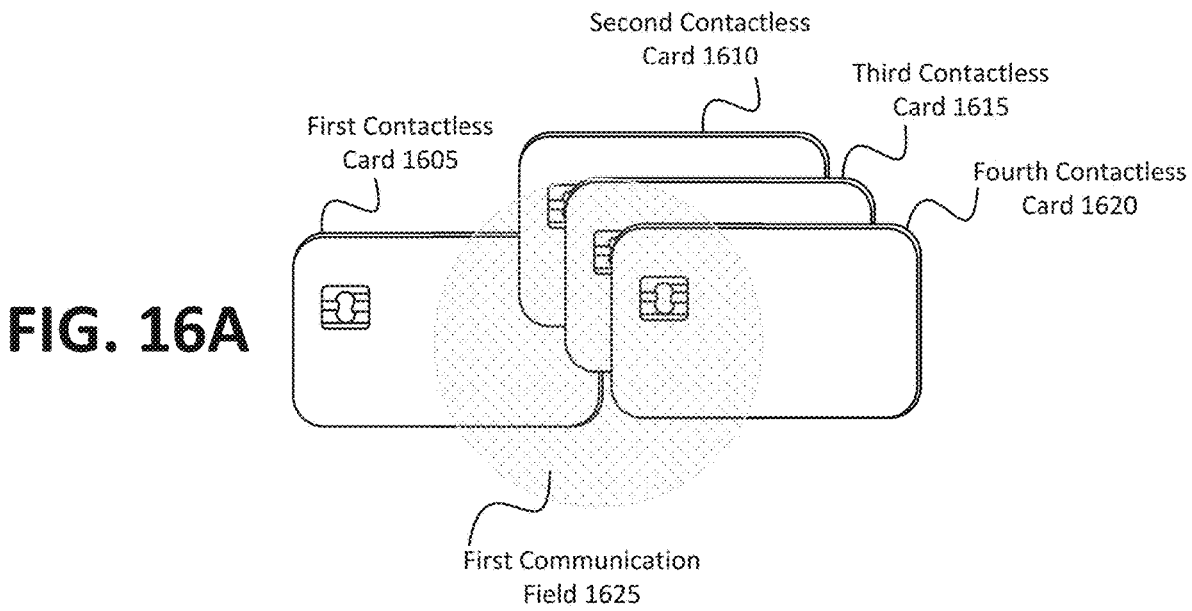
FIGS. 16A-16C illustrate one or more contactless cards with a power element that can receive and transmit payment information according to exemplary embodiments.
Figure 16B:
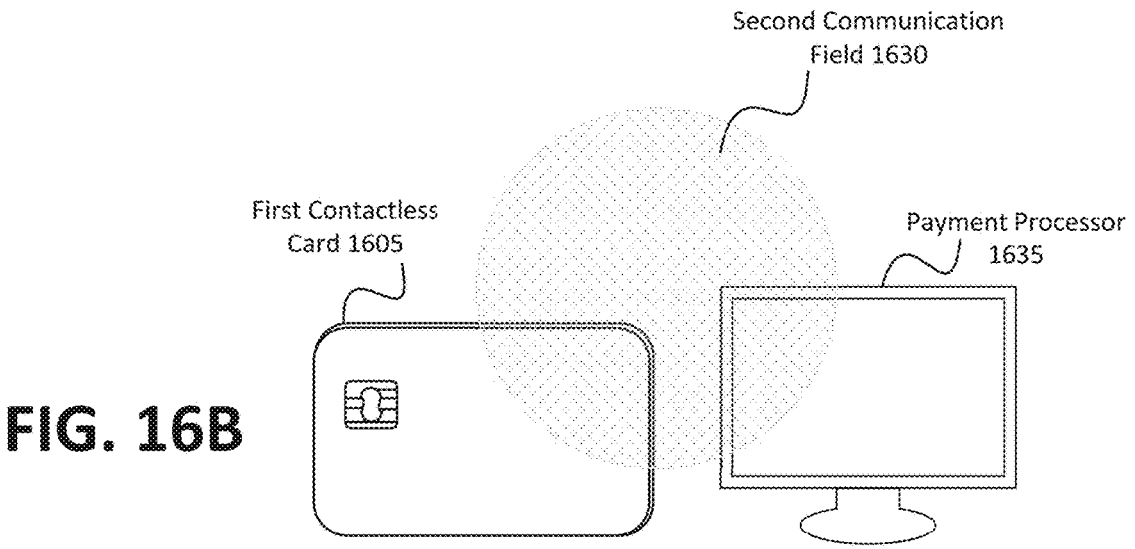

FIGS. 16A-16B are diagrams illustrating sharing payment information according to exemplary embodiments.

FIG. 16A includes a first contactless card 1605, second contactless card 1610, a third contactless card 1615, and a fourth contactless card 1620. The contactless cards can have some or all of the elements described in the contactless cards discussed with further reference to FIGS. 2-3. The first contactless cad 1605 can open at least a first communication field 1625. In other embodiments, the first contactless card 1605 or any of the contactless cards can open multiple communication fields. As a nonlimiting example, the first contactless card 1605 can open a new communication field the second contactless card 1610, third contactless card 1615, and fourth contactless card 1620. Once the second contactless card 1610, third contactless card 1615, and fourth contactless card 1620 has entered the first communication field 1625, each contactless card can transmit payment information to the first contactless card 1605. The payment information can include without limitation an expiration date, security code, card verification value (CVV), a primary account number (PAN), and other identifying information. At least the first contactless card 1605 can further comprise a power element capable of powering a processor within the card to open the first communication field 1625. In other embodiments, the second contactless card 1610, third contactless card 1615, and fourth contactless card 1620 may also have a power cell. Furthermore, the first contactless card 1605 may activate a visual element indicating that the payment information and the request have been received by the selected card. The visual element is discussed with further reference to FIG. 4.

In FIG. 16B, the first contactless card 1605 can open at least a second communication field 1630 between itself and a payment processor 1635. The payment processor is discussed with further reference to FIG. 1. The first contactless card 1605 can transmit the payment information of itself and the other contactless cards from FIG. 16A to the payment processor 1635. The first contactless card 1605 can also transmit a request to distribute a transaction among the payment information.

Figure 16C:
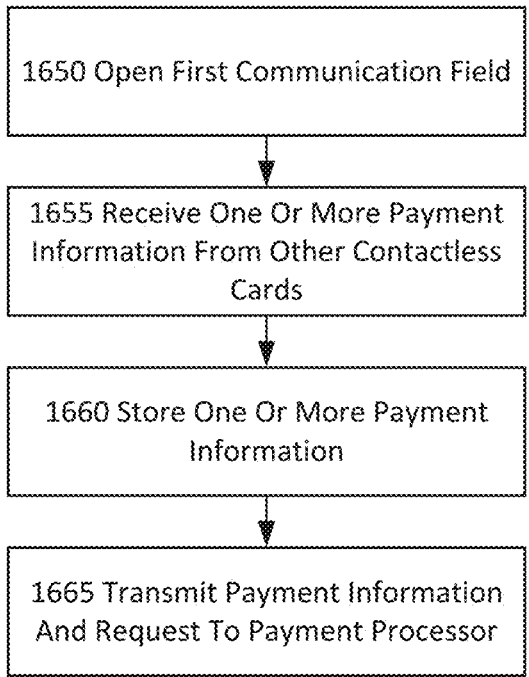

FIG. 16C is a method flowchart illustrating a process for sharing payment information according to an exemplary embodiment. The process can include the one or more contactless cards with connecting elements described in FIGS. 16A-16B. The contactless cards can have some or all of the elements described in the contactless cards discussed with further reference to FIGS. 2-3. The actions can be performed by a processor associated with a first contactless card. In action 1650, the first contactless card can open a first communication field discussed with further reference to FIGS. 6, 16A-16B. In action 1655, the first contactless cad can receive one or more payment information from each of the contactless cards via the first communication field The payment information can include without limitation an expiration date, security code, card verification value (CVV), a primary account number (PAN), and other identifying information. The first contactless card can also receive a request to distribute a transaction among the first contactless card and the other contactless cards which transmitted their payment information. This action can be received from one of the other contactless cards, a user device application, a server, or a payment processor via wired connection, wireless connection, or communication field. In other embodiments, the contactless card can retrieve the request from the card's own memory. Having received the payment information, in action 1660 the contactless card can store the one or more payment information in a memory associated with the contactless card. The memory of the card is discussed with further reference to FIGS. 2-3. In some embodiments, the first contactless card can transmit the payment information to a memory, database, or data storage unit associated with a user device or server via a wired connection, wireless connection, or some communication field including NFC, BLUETOOTH, or RFID. Next, in action 1665 the first contactless card can transmit the one or more payment information and request to a payment processor via a wired connection, wireless connection, or some communication field including NFC, BLUETOOTH, or RFID.

It is understood that the methods discussed elsewhere in the Figures—including without limitation splitting up a transaction into equal and unequal proportions, tapping one or more cards to a phone, selecting which card to receive the request, and requesting authentication credentials—can be applied to the systems and methods described in FIGS. 16A-16C.

In some embodiments, the user device application can generate a VCN upon receiving the payment information of the non-selected contactless card or user devices. For example, the user device application can receive payment information over the first communication field from the one or more non-selected cards, select one of the contactless cards, generate a VCN configured to distribute the transaction among the one or more cards and/or one or more payment applications associated with the VCN and/or the one or more cards, and transmit the VCN to the payment information processor or server. The payment information processor or server can receive the VCN and distribute the transaction accordingly. The payment information processor or server can distribute the transaction according to example mentioned elsewhere throughout the description, such as evenly split or according to a chosen proportion.

Virtual payment cards are unique payment cards that allow users to complete transactions on their main payment card account associated with one or more of their financial accounts without using the assigned numbers associated with these accounts. It is understood that virtual payment cards can have other characteristics and features as described herein. The virtual payment card may be available on a third-party mobile application or web application. The virtual payment card may be sent via short message service (SMS) or multi-media service (MMS) messaging from an account processing system. The virtual card may contain the information present on a physical contactless card discussed in FIG. 2 and FIG. 3.

In some examples, virtual payments cards can be limited to one-time use. In other examples, virtual payment cards can be limited to a predetermined number of uses and/or an unlimited number of uses over a predetermined time period. In some embodiments, the user device application can limit the generated VCN to a one-time use, or the user device application can limit the VCN to a time limit, e.g. 5 minutes.

In some aspects, the techniques described herein relate to a system for distributing a transaction, the system including: a user device application configured to: open a communication field; receive, from each of a plurality of contactless cards, payment information via the communication field; select one of the plurality of contactless cards; and transmit, to the selected contactless card, the payment information of one or more non-selected contactless cards and a request, wherein the request includes a request to distribute a transaction among each of the selected and non-selected contactless cards, and wherein the selected contactless card is configured to transmit the payment information and the request to a payment information processor.

In some aspects, the techniques described herein relate to a system, wherein the user device application operates on at least one selected from the group of a mobile device and a wearable smart device.

In some aspects, the techniques described herein relate to a system, wherein the user device application is further configured to: receive, from the payment information processor after transmitting the payment information and the request, an authentication request; open a second communication field, wherein the second communication field consists of at least one selected from the group of a near field communication (NFC), radio frequency identification (RFID), and BLUETOOTH; receive, from selected card via the second communication field, an authentication credential; and transmit, to the payment information processor, the authentication credential.

In some aspects, the techniques described herein relate to a system, wherein the system includes one or more additional user device applications associated with each of the non-selected contactless cards, wherein the one or more additional user device applications are configured to: receive, from the payment processor, an authentication request; open a communication field; receive, from each additional user device application's respective non-selected contactless card, an authentication credential; and transmit, to the payment processor, the authentication credential.

In some aspects, the techniques described herein relate to a system, wherein one or more of the contactless cards further includes a visual element, wherein the visual element is configured to activate upon the contactless card receiving, from the user device application, the payment information of the non-selected contactless cards and the request.

In some aspects, the techniques described herein relate to a system, wherein the visual element includes at least one of a light emitting diode (LED) and a screen. In other embodiments, the visual element can include at least one of an organic light-emitting diodes (OLED), a polymer light-emitting diode, an active-matrix organic light-emitting diode (AMOLED), or quantum dot light emitting diode (QLED).

In some aspects, the techniques described herein relate to a system, wherein the payment information processor is configured, upon dividing the transaction among each of the selected and non-selected contactless cards, to transmit the distributed transaction to one or more servers, wherein each server is configured to charge one or more financial accounts associated with each of the selected and non-selected contactless cards.

In some aspects, the techniques described herein relate to a system, wherein the request further includes a request to distribute the transaction equally among the each of the selected and non-selected contactless cards.

In some aspects, the techniques described herein relate to a system, wherein the request further includes a request to distribute the transaction unequally among the each of the selected and non-selected contactless cards.

In some aspects, the techniques described herein relate to a system, wherein the user device application is further configured to store the one or more payment information in at least one selected from the group of a memory, a database, and a data storage unit.

In some aspects, the techniques described herein relate to a system, wherein the user device application is further configured to request at least one authentication credential prior to receiving the one or more payment information, the authentication credential including at least one selected from the group of a personal identification number (PIN), a password, and a biometric.

In some aspects, the techniques described herein relate to a method for distributing a transaction, the method including: opening, by a processor, a communication field; receiving, by the processor from each of a plurality of contactless cards, payment information via the communication field; selecting, by the processor, one of the plurality of contactless cards; and transmitting, to the selected contactless card, the payment information of one or more non-selected contactless cards and a request, wherein the request includes a request to distribute a transaction among each of the selected and non-selected contactless cards, and wherein the selected contactless card is configured to transmit the payment information and the request to a payment information processor.

In some aspects, the techniques described herein relate to a method, wherein the method further includes the step of receiving, by the processor from one or more servers upon receiving a payment notification from the payment information processor, one or more authentication requests.

In some aspects, the techniques described herein relate to a method, wherein the method further includes the step of transmitting, by the processor to the one or more servers, one or more authentication credentials.

In some aspects, the techniques described herein relate to a method, wherein the one or more authentication credentials includes a message authentication code (MAC) encrypted by diversified key encryption.

In some aspects, the techniques described herein relate to a method, wherein the method further includes the steps of: transmitting, by the processor to one or more additional user device applications associated with each of the non-selected contactless cards, a distribution request; and receiving, by the processor from one or more additional user device applications associated with each of the non-selected cards, one or more distribution responses, wherein each of the distribution responses consists of at least one selected from the group of an approval, a rejection, and an amendment to the distribution request.

In some aspects, the techniques described herein relate to a method, wherein the method further includes the steps of: storing, by the processor, the payment information on at least one selected from the group of a database, data storage unit, and memory; retrieving, by the processor from the at least one selected from the group of the database, the data storage unit, and the memory, the payment information; and transmitting, by the processor upon retrieving the payment information, the payment information to the selected contactless card.

In some aspects, the techniques described herein relate to a method, wherein the selected contactless card is configured to transmit the one or more payment information and the request to a payment information processor over a second communication field.

In some aspects, the techniques described herein relate to a method, wherein the selected contactless card is the card that is first placed within the communication field before the other plurality of contactless cards.

In some aspects, the techniques described herein relate to a non-transitory computer readable medium containing computer executable instructions that, when executed by a wearable device including a processor, configure the computer hardware arrangement to perform procedures including: opening a communication field; receiving, from each of a plurality of contactless cards, payment information via the communication field; selecting one of the plurality of contactless cards; transmitting, to the selected contactless card, the payment information of the one or more non-selected contactless cards and a request, wherein the request includes a request to distribute a transaction among each of the selected and non-selected contactless cards, and wherein the selected contactless card is configured to transmit the payment information and the request to a payment information processor.

As used herein, user information, personal information, and sensitive information can include any information relating to the user, such as a private information and non-private information. Private information can include any sensitive data, including financial data (e.g., account information, account balances, account activity), personal information/ personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons. Non-private information can include any data that is publicly known or otherwise not intended to be kept private.

As used herein, the terms "card" and "contactless card" are not limited to a particular type of card. Rather, it is understood that the term "card" can refer to a contact-based card, a contactless card, or any other card, unless otherwise indicated. It is further understood that the present disclosure is not limited to cards having a certain purpose (e.g., payment cards, gift cards, identification cards, or membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above-described embodiments, method, and examples, but by all embodiments within the scope and spirit of the invention as claimed.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

What is claimed is:

1. A system for distributing a transaction, the system comprising:
   a plurality of contactless cards, wherein each of the plurality of contactless cards includes a visual element comprising a light-emitting element; and
   a user device application configured to:
      open a communication field;
      receive, from each of the plurality of contactless cards, payment information via the communication field;
      select one of the plurality of contactless cards; and
      transmit, to the selected contactless card, the payment information of one or more non-selected contactless cards and a request,
   wherein the request comprises a request to distribute a transaction among each of the selected and non-selected contactless cards,
   wherein the selected contactless card activates the visual element indicating that the payment information and the request have been received by the selected contactless card,
   wherein the selected contactless card is configured to transmit the payment information and the request to a payment information processor, and
   wherein each of the plurality of contactless cards further includes at least one payment section, at least one non-payment section, and a connecting element, the connecting element connecting the at least one payment section and the at least one non-payment section, the payment information being stored in the at least one payment section, and an authentication credential being required for removing the at least one non-payment section from the at least one payment section by disconnecting the connecting element.

2. The system of claim 1, wherein the user device application operates on at least one selected from the group of a mobile device and a wearable smart device.

3. The system of claim 1, wherein the user device application is further configured to:
   receive, from the payment information processor after transmitting the payment information and the request, an authentication request;
   open a second communication field, wherein the second communication field consists of at least one selected from the group of a near field communication (NFC), radio frequency identification (RFID), and Bluetooth;

receive, from selected card via the second communication field, an authentication credential; and
   transmit, to the payment information processor, the authentication credential.

4. The system of claim 1, wherein the system comprises one or more additional user device applications associated with each of the non-selected contactless cards, wherein the one or more additional user device applications are configured to:
   receive, from the payment information processor, an authentication request;
   open a second communication field;
   receive, from each additional user device application's respective non-selected contactless card, an authentication credential; and
   transmit, to the payment information processor, the authentication credential.

5. The system of claim 1, wherein the visual element is activated upon the selected contactless card receiving, from the user device application, the payment information of the non-selected contactless cards and the request.

6. The system of claim 5, wherein the visual element includes at least one selected from the group of a light emitting diode (LED) and a screen.

7. The system of claim 1, wherein the payment information processor is configured, upon dividing the transaction among each of the selected and non-selected contactless cards, to transmit the distributed transaction to one or more servers, wherein each server is configured to charge one or more financial accounts associated with each of the selected and non-selected contactless cards.

8. The system of claim 1, wherein the request further comprises a request to distribute the transaction equally among the each of the selected and non-selected contactless cards.

9. The system of claim 1, wherein the request further comprises a request to distribute the transaction unequally among the each of the selected and non-selected contactless cards.

10. The system of claim 1, wherein the user device application is further configured to store the one or more payment information in at least one selected from the group of a memory, a database, and a data storage unit.

11. The system of claim 1, wherein the user device application is further configured to request at least one authentication credential prior to receiving the one or more payment information, the at least one authentication credential comprising at least one selected from the group of a personal identification number (PIN), a password, and a biometric.

12. A method for distributing a transaction, the method comprising:
   opening, by a user device application, a communication field;
   receiving, by the user device application from each of a plurality of contactless cards, payment information via the communication field, wherein each of the plurality of contactless cards includes a visual element comprising a light-emitting element;
   selecting, by the user device application, one of the plurality of contactless cards;
   transmitting, by the user device application to the selected contactless card, the payment information of one or more non-selected contactless cards and a request, wherein the request comprises a request to distribute a transaction among each of the selected and non-selected contactless cards;

activating, by the selected contactless card, the visual element after receipt of the payment information and the request; and transmitting, by the selected contactless card to a payment information processor the payment information and the request, and wherein each of the plurality of contactless cards further includes at least one payment section, at least one non-payment section, and a connecting element, the connecting element connecting the at least one payment section and the at least one non-payment section, the payment information being stored in the at least one payment section, and an authentication credential being required for removing the at least one non-payment section from the at least one payment section by disconnecting the connecting element.

13. The method of claim 12, wherein the method further comprises the step of receiving, by the user device application from one or more servers upon receiving a payment notification from the payment information processor, one or more authentication requests.

14. The method of claim 13, wherein the method further comprises the step of transmitting, by the user device application to the one or more servers, one or more authentication credentials.

15. The method of claim 14, wherein the one or more authentication credentials comprises a message authentication code (MAC) encrypted by diversified key encryption.

16. The method of claim 12, wherein the method further comprises the steps of:

transmitting, by the user device application to one or more additional user device applications associated with each of the non-selected contactless cards, a distribution request; and receiving, by the user device application from the one or more additional user device applications associated with each of the non-selected cards, one or more distribution responses, wherein each of the distribution responses consists of at least one selected from the group of an approval, a rejection, and an amendment to the distribution request.

17. The method of claim 12, wherein the method further comprises the steps of:

storing, by the user device application, the payment information on at least one selected from the group of a database, data storage unit, and memory;

retrieving, by the user device application from the at least one selected from the group of the database, the data storage unit, and the memory, the payment information; and transmitting, by the user device application upon retrieving the payment information, the payment information to the selected contactless card.

18. The method of claim 12, wherein the selected contactless card is configured to transmit the one or more payment information and the request to the payment information processor over a second communication field.

19. The method of claim 12, wherein the selected contactless card is the card that is first placed within the communication field before a subsequent contactless card.

20. A non-transitory computer readable medium containing computer executable instructions that, when executed by a user device, configure the user device to perform procedures comprising:

opening a communication field;

receiving, from each of a plurality of contactless cards, payment information via the communication field, wherein each of the plurality of contactless cards includes a visual element comprising a light-emitting element;

selecting one of the plurality of contactless cards; and transmitting, to the selected contactless card, the payment information of the one or more non-selected contactless cards and a request, wherein the request comprises a request to distribute a transaction among each of the selected and non-selected contactless cards, wherein receipt of the payment information and the request causes the selected contactless card to activate the visual element and transmit the payment information and the request to a payment information processor, and wherein each of the plurality of contactless cards further includes at least one payment section, at least one non-payment section, and a connecting element, the connecting element connecting the at least one payment section and the at least one non-payment section, the payment information being stored in the at least one payment section, and an authentication credential being required for removing the at least one non-payment section from the at least one payment section by disconnecting the connecting element.

* * * * *